(12) United States Patent
Shah et al.

(10) Patent No.: US 10,943,244 B2
(45) Date of Patent: Mar. 9, 2021

(54) NETWORK-BASED MULTI-TIER PROMOTION THREAD GENERATOR SHUTDOWN SEQUENCE SYSTEM, METHOD AND COMPUTER PROGRAM PRODUCT

(71) Applicant: Recovery Science LLC, Hollywood, MD (US)

(72) Inventors: Shalin Shah, Hughesville, MD (US); Kusum Raksiklal Shah, Hughesville, MD (US); Jyotsana Nayan Shah, Hughesville, MD (US)

(73) Assignee: RECOVERY SCIENCE LC, Hollywood, MD (US)

( * ) Notice: Subject to any disclaimer, the term of this patent is extended or adjusted under 35 U.S.C. 154(b) by 212 days.

(21) Appl. No.: 16/135,218

(22) Filed: Sep. 19, 2018

(65) Prior Publication Data
US 2019/0087843 A1    Mar. 21, 2019

Related U.S. Application Data

(60) Continuation of application No. 14/293,939, filed on Jun. 2, 2014, now Pat. No. 10,089,644, which is a
(Continued)

(51) Int. Cl.
*G06Q 30/00* (2012.01)
*G06Q 30/02* (2012.01)

(52) U.S. Cl.
CPC ..... *G06Q 30/0214* (2013.01); *G06Q 30/0207* (2013.01); *G06Q 30/0276* (2013.01)

(58) Field of Classification Search
None
See application file for complete search history.

(56) References Cited

U.S. PATENT DOCUMENTS

| 2006/0206385 A1 | 9/2006 | Walker et al. |
| 2007/0265921 A1 | 11/2007 | Rempe et al. |

(Continued)

OTHER PUBLICATIONS

Non-final Office Action U.S. Appl. No. 13/572,696 dated May 16, 2013.
(Continued)

*Primary Examiner* — Alvin L Brown
(74) *Attorney, Agent, or Firm* — Pillsbury Winthrop Shaw Pittman, LLP

(57) ABSTRACT

A method of generating a fixed-price variable-offer multi-tier thread generator may include receiving, a by a computer processor(s), at least a fixed price, a thread expiration criteria and specification for at least two offerings for the fixed price. Each of the at least two offerings correspond to one of at least two tiers of offerings, where the fixed price entitles a first member and any subsequent members on a thread to redeem a qualified offer associated with a qualified tier, in exchange for paying the fixed price, upon the occurrence of at least one thread expiration criteria. The at least one product or service offerings the thread qualifies for, upon the occurrence of the at least one thread expiration criteria, may be dependent upon a total number of members, including the first member who starts a thread from the thread generator and any subsequent members who join the thread and who have agreed to pay the fixed price.

14 Claims, 23 Drawing Sheets

Related U.S. Application Data division of application No. 13/572,696, filed on Aug. 12, 2012, now abandoned.

(60) Provisional application No. 61/673,252, filed on Jul. 19, 2012, provisional application No. 61/523,081, filed on Aug. 12, 2011.

(56) References Cited

U.S. PATENT DOCUMENTS

| | | |
|---|---|---|
| 2007/0294134 A1 | 12/2007 | Yang |
| 2008/0082420 A1 | 4/2008 | Kargman et al. |
| 2009/0106162 A1 | 4/2009 | Shimansky |
| 2010/0179868 A1* | 7/2010 | del Rosario ....... G06Q 30/0222 705/14.16 |
| 2011/0196725 A1 | 8/2011 | Malcolmson et al. |
| 2011/0239044 A1* | 9/2011 | Kumar ............... G06Q 20/4016 714/15 |
| 2012/0143656 A1 | 6/2012 | Murphy |
| 2012/0143753 A1* | 6/2012 | Gonzalez ............... G06Q 20/12 705/41 |
| 2013/0179258 A1 | 7/2013 | Moskos et al. |

OTHER PUBLICATIONS

Discountqueens.com, Coupon Lingo, Jan. 26, 2011.
Non-final Office Action U.S. Appl. No. 14/293,939 dated Aug. 2, 2016.
Final Office Action U.S. Appl. No. 14/293,939 dated Aug. 24, 2017.
Notice of Allowance U.S. Appl. No. 14/293,939 dated Apr. 24, 2018.

* cited by examiner

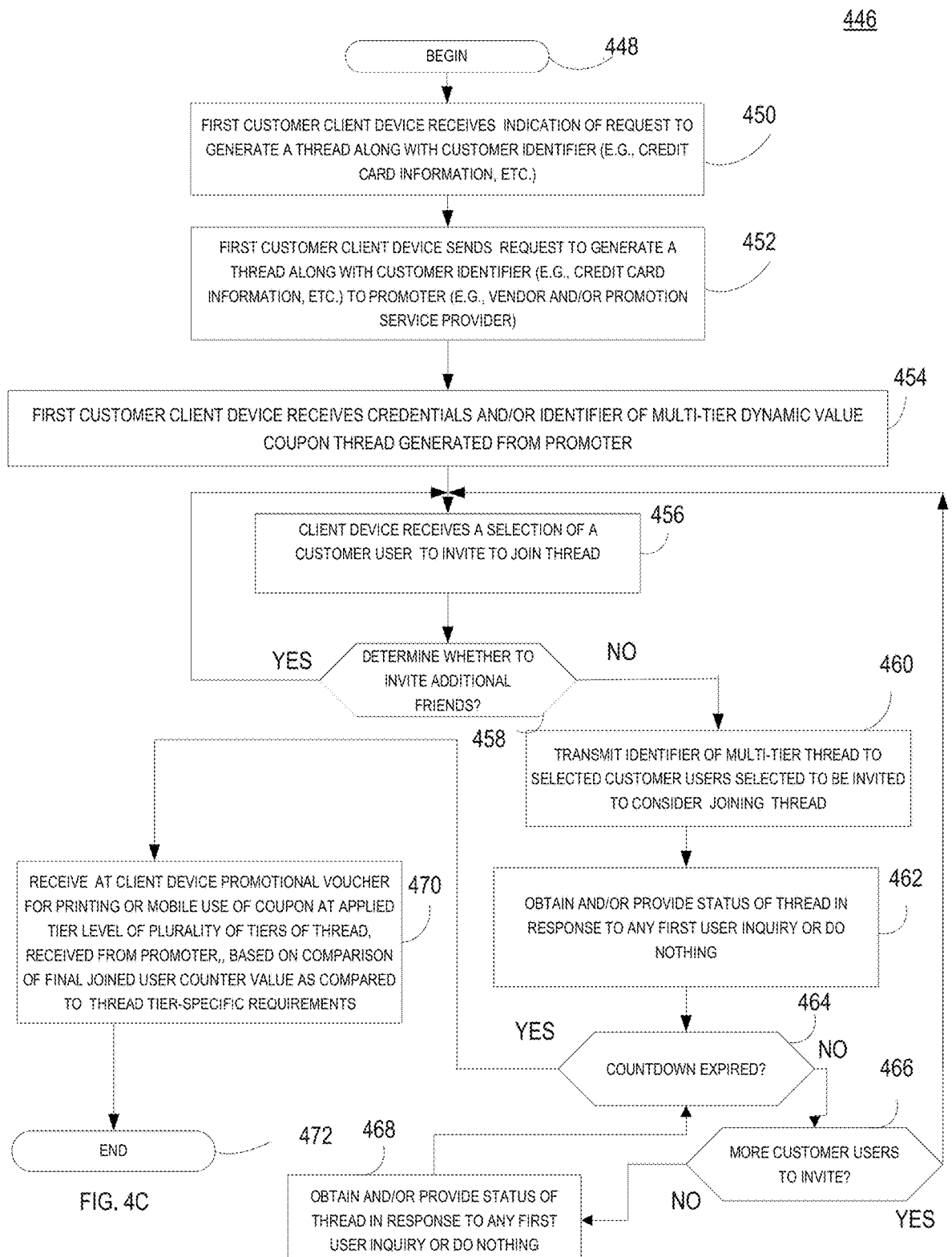

```
┌─────────────────────────────────────────────────────────────┐
│                    ┌──────────────────────┐                 │
│                    │  One embodiment of a │                 │
│                    │   shutdown sequence  │                 │
│                    └──────────────────────┘                 │
│                                                             │
│  ┌───────────────────────────────────────────────────────┐  │
│  │                   Cr a sequence:                      │  │
│  ├───────────────────────────┬───────────────────────────┤  │
│  │          CI: SR           │          CI: SO           │  │
│  ├───────────────────────────┼───────────────────────────┤  │
│  │ VR: _____                │ VO: _____ (ON/OTr/OA)    │  │
│  │ BO: _____(ON/OTr/OA) │ BR: ____                  │  │
│  ├───────────────────────────┼───────────────────────────┤  │
│  │          Seq.             │          Seq.             │  │
│  ├───────────────────────────┼───────────────────────────┤  │
│  │ Br1: ___XN                │ Br1: # ___XN              │  │
│  │ SO: _____(N, Tr, A)  │ SR: ____                  │  │
│  │ Bm: ___XN                 │ Bm: # ___XN               │  │
│  │ SO: _____(Name,Terms,Art)│ SR: ____                │  │
│  │ +Br:                      │ +Br:                      │  │
│  │ C: Upon X1: C for Seq. shutdown. │ C: Upon X1: C for Seq. shutdown. │
│  ├───────────────────────────┼───────────────────────────┤  │
│  │ Pioneer options:          │ Pioneer options:          │  │
│  │  » Cat.                   │  » Cat.                   │  │
│  │  » Spons.                 │  » Spons.                 │  │
│  │  » (+/- Patient Pool) Selective Sample │ » (+/- Patient Pool) Selective Sample │
│  └───────────────────────────┴───────────────────────────┘  │
└─────────────────────────────────────────────────────────────┘
```

| Cr [Creation] of a Sequence ||
|---|---|
| Cl: SO [Class: Variable Offer] | Cl: SR [Class: Variable Remuneration] |
| VR [Fixed Remuneration]: ____ | VO [Fixed Offer]: ____ (ON [Name] / OTr [Terms] / OA [Art]) |
| BO [Base Offer]: ____ (ON [Name] / OTr [Terms] / OA [Art]) | BR [Base Remuneration]: ____ |
| Seq. [Sequence] | Seq. [Sequence] |
| Br [Break] 1: ___ XN [Example Buyers needed] | Br [Break] 1: ___ XN [Example Buyers needed] |
| SO [Variable Remuneration]: ____ (N [Name], Tr [Terms], A [Art]) | SR [Variable Remuneration]: ____ |
| Br [Break] n: ___ XN [Example Buyers needed] | Br [Break] n: ___ XN [Example Buyers needed] |
| SO [Variable Remuneration]: ____ (N [Name], Tr [Terms], A [Art]) | SR [Variable Remuneration]: ____ |
| +Br [Add Break] | +Br [Add Break] |
| C [Sequence Shutdown]: Upon X [Buyer] 1, settings for Seq. shutdown | C [Sequence Shutdown]: Upon X [Buyer] 1, settings for Seq. shutdown |

FIG. 8A2

| Cr#: _____ Instance #: _____ | | | | | |
|---|---|---|---|---|---|
| Pioneer: | | | | XN: ___ | FP |
| VR: | | | Br | T | <Submit> |
| Br Tr. | | | st | | |
| Br | XN | ON/OTr/OA | ind | Cr# Updates – Gr.Rs. Data | Pass |
| 1 | SC (Successfully Crossed) | | | Patients / Time / Info from SQL | <modularized> |
| n | | | | | |

| O#: _____ Instance #: _____ | | | | | |
|---|---|---|---|---|---|
| Pioneer: | | | | XN: ___ | GMP |
| VO: ON/OTr/OA | | | Br | T | <Submit> |
| Br Tr. | | | st | | |
| | | | ind | Cr# Updates – Gr.Rs. Data | |
| Br | XN | R | | Patients / Time / Info from SQL | Pass |
| 1 | | | | | <modularized> |
| n | | | | | |

Fig. 8B1

| Cr [Creation] #: _____ Instance #: _____ | | | | |
|---|---|---|---|---|
| Pioneer: | | | Br | XN: [Example (Buyer) Quantity]: |
| VR [Fixed Remuneration Required]: | | | Ind. | |
| Br Tr. [Break Tracker] | | | | Cr[Creation]# Updates for this sequence (thread) instance |
| Br [Break]: | XN [Example (Buyer) Quantity]: | ON [Offer Name] / Otr [Offer Terms] / OA [Offer Art] | | Gr[Group] Pass and Rs[Remuneration Submitted] Data Patients / Time / Info from SQL |
| 1 | | | | |
| n | | | | |

| O [Offer] #: _____ Instance #: _____ | | | | |
|---|---|---|---|---|
| Pioneer: | | | Br. | XN: [Example (Buyer) Quantity]: |
| VR [Fixed Remuneration Required]: | | | Ind. | |
| Br Tr. [Break Tracker] | | | | Cr[Creation]# Updates for this sequence (thread) instance |
| Br [Break]: | XN [Example (Buyer) Quantity]: | R [Remuneration Needed] | | Gr[Group] Pass and Rs[Remuneration Submitted] Data Patients / Time / Info from SQL |
| 1 | | | | |
| n | | | | |

FIG. 8B2

| | |
|---|---|
| Cr | Creation |
| C | Sequence shutdown |
| MD | Medical Doctor |
| Gr | Group |
| Br Tr | Tracker |
| Status | Status |
| Ind | Indicator |
| Br | Break |
| Cl | Class |
| Instance | Instance |
| Cat | Category |
| Spons | Sponsor |
| XN | Example qty (buyers) |
| S | Variable |
| V | Fixed |
| Sv | Volatile |
| R | Remuneration Needed |
| Rs | Remuneration Submitted |
| O | Offer |
| B | Base |
| N | Name |
| Tr | Terms |
| A | Art |

| Create a DVSP (Shutdown sequence): ||
|---|---|
| Option 1: Fixed Price (Variable Offer) | Option 2: Fixed Offer (Variable Price) |
| ➢Fixed Price: $_____ | ➢Fixed Offer: _____ Upload Art:_____ |
| ➢Base Offer: _____ Upload Art:_____ | ➢Base Price: $_____ |
| Now make it fun<br>What does the group get if they pass this deal around? | Now make it fun<br>What does the group get if they pass this deal around? |
| ➢Milestone 1: #___Buyers<br>Upgraded offer:_____ Upload Art:_____ | ➢Milestone 1: #___Buyers<br>New Reduced Price: $_____ |
| ➢Milestone 2: #___Buyers<br>Upgraded offer:_____ Upload Art:_____ | ➢Milestone 2: #___Buyers<br>New Reduced Price: $_____ |
| ➢Milestone 3: #___Buyers<br>Upgraded offer:_____ Upload Art:_____ | ➢Milestone 3: #___Buyers<br>New Reduced Price: $_____ |
| +Add Milestone | +Add Milestone |
| ➢Time: How much time after the 1st buyer buys does the group have to hit deal milestone ___d ___h ___m | ➢Time: How much time after the 1st buyer buys does the group have to hit deal milestone ___d ___h ___m |
| Now, make sure people know about the deal! | Now, make sure people know about the deal! |
| ➢Categorize It! So Shoppers can search by category | ➢Categorize It! So Shoppers can search by category |
| ➢Sponsor your position! So your deal is at the top | ➢Sponsor your position! So your deal is at the top |
| ➢Request your deal to be emailed:<br>We have over # members with interest profiles!<br>We can pass this promotion to who we know will be interested. The fee for this service 20%. | ➢Request your deal to be emailed:<br>We have over # members with interest profiles!<br>We can pass this promotion to who we know will be interested. The fee for this service 20%. |

FIG. 9

| Deal #: | | Instance #: | | | | join the deal |
|---|---|---|---|---|---|---|
| Vendor Name: | | | M Status | # Sold: __! | | |
| Fixed Price: | | | | __ more needed to hit the next big break! | | Payment info: (Fixed price) |
| Milestone Tracker | | | | Time Left: __ days __ hours __ mins __ secs | | <Submit> |
| M# | Buyers Needed | Offer Name | | Who/What/When/Where/How/Why (deal module thread) | | |
| 1 | Successfully crossed | | | | | Pass this deal! <module to send to others> |
| 2 | | | | | | |
| 3 | | | | | | |
| 4 | | | | | | |
| n | | | | | | |

| Deal #: | | Instance #: | | | | join the deal |
|---|---|---|---|---|---|---|
| Vendor Name: | | | M Status | # Sold: __! | | |
| Fixed Offer Name / Terms / Artwork: | | | | __ more needed to hit the next big break! | | Payment info: (Fixed price) |
| Milestone Tracker | | | | Time Left: __ days __ hours __ mins __ secs | | <Submit> |
| M# | Buyers Needed | Price | | Who/What/When/Where/How/Why (deal module thread) | | |
| 1 | | | | | | Pass this deal! <module to send to others> |
| 2 | | | | | | |
| 3 | | | | | | |
| 4 | | | | | | |
| n | | | | | | |

FIG. 10

NETWORK-BASED MULTI-TIER PROMOTION THREAD GENERATOR SHUTDOWN SEQUENCE SYSTEM, METHOD AND COMPUTER PROGRAM PRODUCT

CROSS-REFERENCE TO RELATED APPLICATIONS

This application is a Continuation application of U.S. Ser. No. 14/293,939, filed Jun. 2, 2014, which is a Divisional application of U.S. Ser. No. 13/572,696, filed Aug. 12, 2012, and is related to and claims the benefit under 35 USC Section 119 (e) of U.S. Provisional Patent Application Ser. No. 61/523,081, filed Aug. 12, 2011, and is also related to and claims the benefit under 35 USC Section 119 (e) of U.S. Provisional Patent Application Ser. No. 61/673,252, filed Jul. 19, 2012. The contents of each of these applications are incorporated herein by reference in entirety.

BACKGROUND OF THE INVENTION

Field of the Invention

The present invention relates generally to promotions and coupons, and more particularly to electronic promotions.

Discussion of the Related Art

Conventionally, various systems have existed for providing coupons and promotions both in an offline environment and in an electronic environment.

A conventional coupon is a loss leading type of sale, promotion, or discount offer enticing customers to purchase a good, or service. A coupon normally has an expiration date within which redemption or fulfillment is due. Coupons were originally distributed by mail and as advertising promotions with newspaper and magazine print media.

More recently, coupons and other such promotions have become more targeted using such technologies as demographic and psychographic analysis of potential customers by marketers or promoters. Indeed a large proportion of conventional postal delivery junk mail includes targeted promotions such as, e.g., but not limited to, discounts, product coupons, trial offers, credit card applications, political solicitations, etc. With the development of intelligent point of sale (POS) systems from companies like NCR and IBM, highly targeted coupons became available at POS.

Online systems of advertising and promotion have matured from early banner ads, to ever more sophisticated ad serving systems, providing tailored, targeted advertising and promotions to interactive internet browser based user interfaces.

The growth of the global Internet has accelerated ad serving based on per click models among others. With the advent of ubiquitous mobile networks and social networks today reaching a critical mass of consumers, additional novel promotional offerings have been developed directed at networked users.

Online communities began with bulletin board systems (BBSs) in the 1980s. Social networks began to develop in the mid-1990s with increasing popularity of the world wide web (WWW). Early social networks included Friendster, followed by MySpace, Linkedin, Yahoo! 360, XING, etc. Perhaps the most successful social network to date is Facebook, whose reach spans continents and generations. Social networks allow users, e.g., to create profile pages containing information about user members are willing share about themselves with others, and allow the user members to create lists of contacts or friends, which may be granted access to content links or posts of the given user member.

Marketers have strived to use the power of social media to promote products. Daily deal sites provide customer users an opportunity to peruse, for example, a periodic communication message, with an offer that includes various restrictions and an expiration date.

Groupon.com available from Groupon, Inc. of Chicago, Ill. USA, is a subscription service offering a daily deal communication to customer users that may start at a deep percent discount. Groupon guarantees a business owner a minimum return. After the Groupon customer receives the daily email with a deal offering thread, the customer may select to purchase the product, and then enters the customer's credit card information. Thus the customer agrees to pay up front, and if the offer is closed, then revenue from the sale is split between Groupon and the business owner providing the product or service. A Groupon deal has a single countdown for how long the deal is available for purchase. For example, Groupon requires a minimum dollar amount of sales, or the deal is off. For example, until at least a vendor selectable amount of people sign up for the offer (e.g., 30) no one can redeem, but once the amount is reached, the deal is said to "tip," and then the discount is "on." Once tipped, the offer is automatically purchased using the customer's credit card information, and a coupon voucher may be issued having a redemption or fulfillment date. For the customer to redeem a coupon, a redemption code may be printed, or a barcode may be displayed on, e.g., a smartphone, allowing redemption or fulfillment similar to conventional coupons.

LivingSocial.com available from LivingSocial, Inc. of Washington, DC, USA provides another daily deal offering, which sends a discounted offering email to customers in a given locality. Offerings of a vendor, for example, restaurants, spas, shops, travel, etc. are offered to customers by LivingSocial via, e.g., an email communication. The customer can choose and buy an offering. The customer may subscribe to areas of interest. Then the LivingSocial customer can share his or her purchase with friends of the customer's social network; for example, the customer can send an alert or notification to some or all of the customer's friends by, e.g., a Tweet to Twitter, a post to Facebook, or by sending a unique link to friends in an email. Using LivingSocial, if e.g., three people buy the customer's deal with the link provided by the customer, then the deal may be made free to that original customer.

Conventional couponing methods and systems have various shortcomings. What is needed is an improved system that overcomes the various shortcomings of conventional solutions.

Summary of Various Exemplary Embodiments of Invention

Various exemplary embodiments of a system, method and computer program product for providing network-based promotions is set forth in detail herein.

According to one exemplary embodiment, a computer implemented method, system, and/or computer program product executable on a computer processor to cause a method of creating a multi-tier promotion thread generator may include: a) receiving, by at least one computer processor, at least one specification for a multi-tiered promotion thread generator comprising at least one of: at least one promotion-level specification comprising at least one of: at least one promotion name; or at least one promotion expiration; at least one thread-specific specification comprising at least one of: at least one requirement for a first buyer of the promotion to start a thread; or at least one thread lifespan for at least one countdown timer; or at least one tier-specific specification comprising at least one of: at least one specification for a plurality of tiers comprising at least one of: at least one joining requirement for at least one subsequent customer; b) creating, by the at least one computer processor, at least one promotion thread generator; and at least one associated thread generator identifier (generator ID) from said at least one specification; and c) publishing, by the at least one computer processor, the promotion thread generator and associated generatorID.

According to one exemplary embodiment, the method may further include: ,d) receiving, by the at least one computer processor, at least one required input parameter from at least one customer interested in being the first buyer of a respective associated thread of the first buyer.

According to one exemplary embodiment, the method may further include: e) validating, by the at least one computer processor, the first buyer said at least one required input parameter of the first buyer.

According to one exemplary embodiment, the method may further include: d) generating, by the at least one computer processor, at least one new thread each comprising at least one thread identifier and at least one thread-specific countdown timer associated with said at least one new thread according to said thread lifespan specification of said at least one countdown timer specification.

According to one exemplary embodiment, the method may include where the at least one thread identifier may include at least one of: at least one primary key; at least one unique identifier; or at least one hyperlink identifier parameter.

According to one exemplary embodiment, the method may further include: e) starting, by the at least one computer processor, said at least one thread-specific countdown timer.

According to one exemplary embodiment, the method may further include: e) associating, by the at least one computer processor, the first customer with the at least one new thread.

According to one exemplary embodiment, the method may further include: e) providing, by the at least one computer processor, the first customer said at least one thread identifier.

According to one exemplary embodiment, the method where the providing may include at least one of: enabling, by the at least one computer processor, a later reference to said at least one new thread; enabling, by the at least one computer processor, sharing of said at least one thread identifier to at least one peer customer user; enabling, by the at least one computer processor, the at least one peer customer user to access said at least one new thread; enabling, by the at least one computer processor, the at least one peer customer user to join said at least one new thread; or enabling, by the at least one computer processor, the at least one peer customer user to later reference said at least one new thread.

According to one exemplary embodiment, the method may further include: d) joining, by the at least one computer processor, to said at least one new thread at least one subsequent customer wishing to join said at least one new thread, may include: receiving, by the at least one computer processor, input from the at least one subsequent customer; validating, by the at least one computer processor, said input from the at least one subsequent customer, joining, by the at least one computer processor, to said thread the at least one subsequent customer when said validating is successful, and adjusting, by the at least one computer processor, said thread property based on at least one mutually-exclusive tier reached.

According to one exemplary embodiment, the method may further include: e) closing, by the at least one computer processor, said at least one thread upon expiration of said at least one thread-specific countdown timer.

According to one exemplary embodiment, the method may further include: e) generating, coordinating, and closing when validated, by the at least one computer processor, a plurality of threads based on said promotion specifications.

According to one exemplary embodiment, the method may further include: d) closing, by the at least one computer processor, said promotion upon expiration of said promotion-specific expiration date.

According to one exemplary embodiment, a method of generating at least one multi-tier promotion thread using at least one multi-tier promotion thread generator may include: a) generating, by at least one computer processor, upon initiation by a first customer user, at least one new multi-tier promotion thread, wherein each said at least one new multi-tier promotion thread comprises at least one thread identifier; and at least one thread-specific countdown timer associated with said at least one new multi-tier promotion thread, wherein said at least one thread-specific countdown timer comprises at least one thread lifespan.

According to one exemplary embodiment, the method may further include: b) enabling, by the at least one computer processor, sharing of said at least one new multi-tier promotion thread with at least one subsequently joining customer user.

According to one exemplary embodiment, the method may further include: c) receiving, by the at least one computer processor, an indication of joining from the at least one subsequently joining customer user until expiration of said thread-specific countdown timer at end of said thread lifespan.

According to one exemplary embodiment, the method may further include: d) providing, by the at least one computer processor, at least one promotion voucher to each of the at least one subsequently joining customer users.

According to another exemplary embodiment, a method may include: a) providing, by the at least one computer processor, a first customer at least one multi-tier promotion thread identifier, wherein said providing comprises at least one of: enabling, by the at least one computer processor, a later reference to said at least one new thread; enabling, by the at least one computer processor, sharing of said at least one thread identifier to at least one peer customer user; enabling, by the at least one computer processor, the at least one peer customer user to access said at least one new thread; enabling, by the at least one computer processor, the at least one peer customer user to join said at least one new thread; or enabling, by the at least one computer processor, the at least one peer customer user to later reference said at least one new thread.

According to one exemplary embodiment, a computer implemented method of generating a multi-tier dynamic value promotion thread generator (multi-tier thread generator) may include: creating, by at least one computer processor, the thread generator, which may include: receiving, by the at least one computer processor, terms of the at least one multi-tier dynamic value promotion thread generator adapted to generate at least one multi-tier dynamic value promotion thread (multi-tier thread), wherein the terms may specify (e.g., but not limited to): at least one tier-specific benefit term, and at least one tier-specific requirement term for each of at least two tier levels of the thread generator; and at least one thread-specific countdown timer, wherein after generation of a generated thread by a first customer user, a value of the tier-specific benefit term of the generated multi-tier thread may be determined by comparing: a number of joined customer users upon expiration of the countdown timer, to the tier-specific requirement terms, to identify the tier of the at least two tier levels corresponding to the number of joined customer users.

According to one exemplary embodiment, the method may further include transmitting, by the at least one computer processor, a link to the dynamic value multi-tier promotion thread to the first user upon creating the generated thread by the thread generator, for sharing by the first user to at least one other customer user.

According to one exemplary embodiment, the method may include where upon receiving notification of the first customer joining the promotion offering thread, initiating, by the at least one computer processor, the limited time countdown timer until expiration; and counting, by the at least one computer processor, a number of joined customer users joining the generated multi-tier dynamic value promotion thread.

According to one exemplary embodiment, the method may include where upon receiving notification of a customer using the multi-tier thread generator to be the founding customer of one thread wherein the customer is by default the first customer on the multi-tier thread, having had to satisfy the terms of the first tier, initiating, by the at least one computer processor, the limited time countdown timer until expiration; and counting, by the at least one computer processor, a number of joined customer users joining the generated multi-tier dynamic value promotion thread.

According to one exemplary embodiment, the method may include where said plurality of said tiers may include mutually exclusive requirement terms. In one exemplary embodiment, these mutually exclusive requirement terms may enable clear determination as to which tier of value a particular thread has reached. In one exemplary embodiment, mutually exclusive requirement terms can be decided in the form of non-overlapping ranges of customers required to be at any particular tier.

According to one exemplary embodiment, the method may include where any customer users joining the thread may include: receiving, by the at least one computer processor, an identifier for the any customer users; and associating, by the at least one computer processor, the identifier for the any customer users with the generated thread.

According to one exemplary embodiment, the method may include where the identifier for the any customer users may include at least one of: a financial agreement to purchase the multi-tier dynamic value promotion multi-tier thread to satisfy the requirements of the tier the thread has reached at the time of a customer joining the multi-tier thread; a customer number of the any customer user; a credit card number of the any customer user; a debit card number of the any customer user; a social security number of the any customer user; an email address of the any customer user; or a user name of the any customer user.

According to one exemplary embodiment, the method may include where upon the expiration of the countdown timer, the thread benefit is set based on the tier of the at least two tiers corresponding to the amount of joined customer users. In one exemplary embodiment, upon expiration of the countdown timer, the thread may be locked at the highest achieved tier that the thread was able to achieve and e.g., all users who have joined the thread, perhaps at different tiers, may be distributed the agreed benefit of the achieved tier and may be held to the requirements as specified by the final tier. In one exemplary embodiment, the requirements are an agreed monetary price that customers may be charged and the benefit may be an agreed promotion with terms as specified by the thread generator.

According to one exemplary embodiment, the method may include where the at least two tiers may include at least three tiers.

According to one exemplary embodiment, a system of providing a dynamic value promotion thread generator may include, a computer memory; at least one computer processor coupled to said memory, wherein said at least one computer processor is adapted: to create the thread generator comprising wherein said at least one computer processor is adapted to: receive terms of the at least one multi-tier dynamic value promotion thread generator adapted to generate at least one thread, wherein said terms comprise: at least one tier-specific benefit term, and at least one tier-specific requirement term for each of at least two tier levels of the thread generator; and specifications to at least one thread-specific countdown timer, wherein upon generation of a generated thread by a thread-initiating customer user (the founding customer of one of possibly several threads generated by the thread generator), a thread-specific countdown timer may be started and may upon expiry of said thread-specific countdown timer, the final achieved said tier of said generated thread may be determined by comparing: a number of joined customer users upon expiration of said countdown timer, to said tier-specific requirement terms, to identify the tier of said at least two tier levels corresponding to said number of joined customer users.

According to one exemplary embodiment, a computer program product embodied on a computer readable medium, said computer program product comprising program logic adapted to be executed on a computer processor to implement a method of providing a multi-tier dynamic value promotion thread generator may include: creating, by at least one computer processor, the multi-tier thread generator may include, e.g., but not limited to: receiving, by the at least one computer processor, terms of the at least one multi-tier dynamic value promotion thread generator adapted to generate at least one thread, wherein said terms comprise: at least one tier-specific benefit term, and at least one tier-specific requirement term for each of at least two tier levels of the thread generator; and at least one thread-specific countdown timer, wherein upon generation of a generated thread by a first customer user, a value of said tier-specific benefit term of said generated thread may be determined by comparing: a number of joined customer users upon expiration of said countdown timer, to said tier-specific requirement terms, to identify the tier of said at least two tier levels corresponding to said number of joined customer users.

According to an exemplary embodiment, a computer implemented method of providing a multi-tiered, dynamically changing value, promotion thread generator may include: creating, by at least one computer processor, a thread generator for dynamic-value promotion (e.g., coupon) thread. The creation process may include: receiving parameters of the promotion thread (e.g., a thread generator's title), by the at least one computer processor, receiving terms for at least two (e.g., mutually exclusive) tier pricing levels, where the achieved tier level of any particular thread generated by the thread generator may be based upon a number of users who have joined the thread, and the tier is determined at the end of a limited time countdown timer, where the parameters may include, e.g., but not limited to, thread parameters, thread specific parameters, and tier-specific parameters. According to an exemplary embodiment, a computer implemented mechanism may be provided to allow a customer to use the thread generator to generate a thread. According to another exemplary embodiment, upon the first user generating the thread, the user may receive a link to the thread that the user has originated, and may circulate that thread to any customer users who may wish to consider joining the thread.

According to an exemplary embodiment, promoters or vendors may face several challenges in achieving an end goal of encouraging usage of a product and/or service that the promoter or vendor are promoting. According to an exemplary embodiment, one or more exemplary apparatus(es), device(s), method(s), and/or business method(s) are set forth, which may be used by a marketer user such as, e.g., but not limited to, a 'promoter,' and/or a 'vendor', etc., to create an exemplary dynamic value social promotion (DVSP) as illustrated in, and discussed further below with reference to, e.g., FIGS. 1-10. According to an exemplary embodiment, the method may include receiving from the marketer and associating with an offer thread, any of a plurality of restrictions, such as, e.g., but not limited to, a limited number of customer individuals that may redeem the DVSP as a first buyer (FB), creating a so-called "thread" for a particular buyer's redemption of the deal. According to an exemplary embodiment, the method may include a dynamic creation of an exemplary countdown timer that can be variably set by the marketer for that thread's finalization, wherein no more customers or buyers of the initial customer or buyer (defined herein as "friends") may redeem the DVSP from that thread. One exemplary embodiment may include exemplary restrictions (not shown) such as, e.g., but not limited to, a maximum number of individuals who can redeem the DVSP from a particular thread, a random creation of an exemplary multi-tiered-value-structure to simulate an experience of a "lottery" or "raffle" effect wherein at higher tiers, offers could, for example, but not limited to, get variably more valuable. One exemplary embodiment of the invention may include an exemplary association of an exemplary point system to the first buyer based on exemplary performance metrics, such as, e.g., but not limited to, revenue generated from a DVSP or the number of individuals who have passed the DVSP to others. One exemplary embodiment of the invention may include where the computer processor-implemented method may include receiving an association of an individual's joining a thread, where the individual may indicate to the system which individual may be currently "in the action" (also know as, are joining the DVSP). According to an exemplary embodiment, the method may include tracking, or allowing the individual user to be given points or another indicia based on the individual user being credited with generating a sale closed by another individual who has joined a thread. According to an exemplary embodiment, a combination of two or more offers of an exemplary discount may be provided at an exemplary pair of exemplary separate exemplary tier level(s) and/or milestones.

One exemplary embodiment of the invention may include receiving any authorization of an individual's payment method (such as, e.g., but not limited to, a credit card) for a monetary amount (i.e. price) of the current tier of a multi-tier thread is at (the presently achieved tier of the thread), followed by the charging of the variable amount as specified by the requirements of the final achieved tier the thread reached upon expiration of the dynamic countdown generated by the first buyer (creator) of the thread.

One exemplary embodiment of the invention may include marketing of specific DVSPs to individuals within a structured database of user-user social connections and optionally user interests. This ability to enable targeting of the DVSP based on characteristics of a user may enable a nonobvious possibility for a marketer to generate new customers from an exemplary later-adopter category of a given total addressable market who may be probabilistically more interested in a DVSP after a first-buyer, which the subsequent buyer(s) may consider a peer, and possibly one or several others, may have indicated the subsequent interest and may have depressed the price of joining that particular thread lower. One embodiment of the invention may include the DVSP vendor service, which may provide the marketer, or promoter, or vendor, the ability to pay for varying levels of detail regarding the dynamics of their promotion, such as views, customer actions such as sales, referrals, etc.

One exemplary embodiment of the invention may include an exemplary dynamic modification of a given DVSP thread countdown, based on events taken against the thread. For example, the marketer (creator of the promotion) may set up an exemplary promotion to add an exemplary specific amount of time to the countdown upon determination of a new individual's joining the thread, possibly at varying points along the exemplary thread.

One exemplary embodiment of the invention may include an exemplary ability for one or more individual(s) of a certain health group, such as, e.g., but not limited to, smokers, etc., to join such a network and may then, based on their having reached certain health goals, join threads and redeem DVSPs. According to an exemplary embodiment, the method of facilitating a group's participation may create a nonobvious effect of the group's membership commiserating regarding their struggle together in a network to having reached a health goal and thereby being rewarded.

In one exemplary embodiment, a particular class of thread generator (shutdown sequence) may be set by a promoter to enable a variation of a "fixed price, variable offer" and/or "fixed offer, variable price" thread class wherein the offer (or offers if there are multiple offer tiers) are a percentage off discount with other possible terms associated such as, e.g., but not limited to, a maximum dollars (i.e., value) the coupon voucher may used for, expiration date, etc. According to an exemplary embodiment, the exemplary thread generator can enable, for example, but not limited to, "pre-selling of coupons" to users.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of an embodiment of the invention, as illustrated in the accompanying drawings wherein like reference numbers generally indicate identical, functionally similar, and/or structurally similar elements. The left most digits in the corresponding reference number indicate the drawing in which an element first appears.

FIG. 4C depicts an exemplary flow diagram, according to an exemplary embodiment illustrating an exemplary process of requesting a generated thread for a first customer user, and receiving and sharing thread indicia with other users to join the thread, according to an exemplary embodiment;

FIG. 6C depicts another exemplary embodiment of a diagram 630 illustrating an exemplary user interface screenshot depicting an exemplary interface for creating an exemplary interface for creating a no commitment, just pass the deal and make it bigger exemplary promotion dynamic value coupon multi-tiered thread generator, according to an exemplary embodiment;

FIG. 8A1 depicts an exemplary embodiment of a diagram illustrating an exemplary interface definition for an exemplary thread generator as will be apparent to those having ordinary skill in the relevant art, according to an exemplary embodiment;

FIG. 8A2 depicts another exemplary embodiment of a diagram, similar to FIG. 8A1, illustrating an exemplary interface definition for an exemplary thread generator as will be apparent to those having ordinary skill in the relevant art, according to an exemplary embodiment; FIG. 8B1 depicts an exemplary embodiment of a diagram illustrating an exemplary interface definition for an exemplary multi-tier offering thread of n-tiers, as will be apparent to those skilled in the relevant art, according to an exemplary embodiment;

FIG. 8B2 depicts another exemplary embodiment of a diagram, similar to FIG. 8B1, illustrating an exemplary interface definition for an exemplary multi-tier offering thread of n-tiers, as will be apparent to those skilled in the relevant art, according to an exemplary embodiment;

FIG. 9 depicts an exemplary embodiment of a diagram illustrating an exemplary process of creating a promotion as illustrated in another exemplary embodiment of a prompting list of user instructions to be displayed by the computing device, according to an exemplary embodiment, according to an exemplary embodiment;

FIG. 10 depicts an exemplary embodiment of a diagram illustrating interface definition for an exemplary multi-tier offering thread of n-tiers, as will be apparent to those skilled in the relevant art.

DETAILED DESCRIPTION OF EXEMPLARY EMBODIMENTS OF THE INVENTION

Figure 1A:
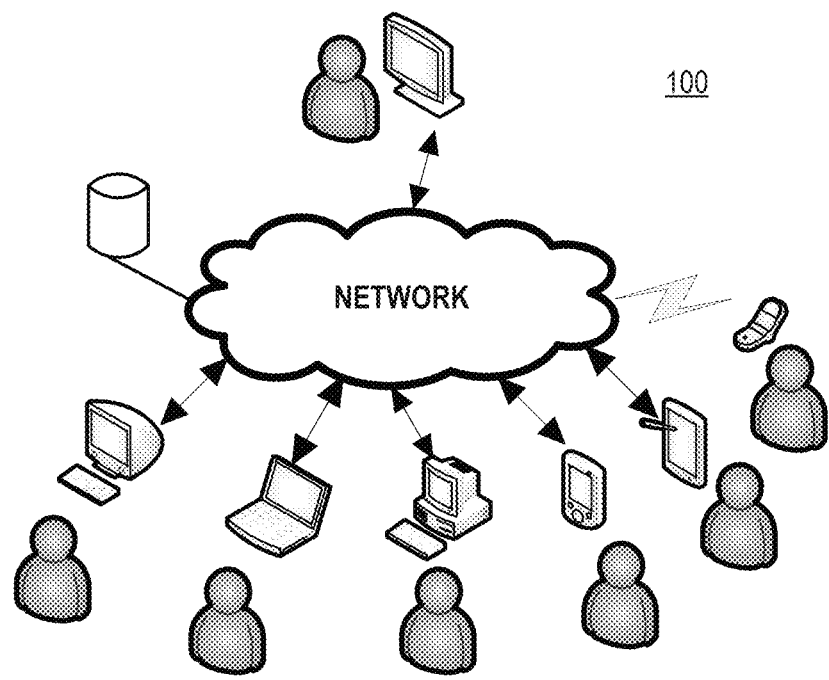
FIG. 1A depicts an exemplary view of an exemplary embodiment of an exemplary heterogeneous client device environment coupled to an exemplary network system adapted to provide a network-based promotions system architecture environment using a plurality of computing and communication devices coupled together in a distributed networked system architecture, according to an exemplary embodiment.

Various exemplary embodiments of the invention are discussed in detail below. While specific exemplary embodiments are discussed, it should be understood that this is done for illustration purposes only. Exemplary means example for purposes of this application, and various embodiments need not include all features as described herein. A person skilled in the relevant art will recognize that other components and configurations can be used without parting from the spirit and scope of the invention.

Overview of Exemplary Embodiments

According to an exemplary embodiment, promoters or vendors may face several challenges in achieving an end goal of encouraging usage of a product and/or service that the promoter or vendor are promoting. According to an exemplary embodiment, one or more exemplary apparatus(es), device(s), method(s), and/or business method(s) are set forth, which may be used by a marketer user such as, e.g., but not limited to, a 'promoter,' and/or a 'vendor', pioneer of a deal, etc., to create an exemplary dynamic value social promotion (DVSP) as illustrated in, and discussed further below with reference to, e.g., FIGS. 1A-11. According to an exemplary embodiment, the method may include receiving from the marketer and associating with an offer thread, any of a plurality of restrictions, such as, e.g., but not limited to, a limited number of customer individuals that may redeem the DVSP as a first buyer (FB), creating a so-called "thread" for a particular buyer's redemption of the deal. According to an exemplary embodiment, the method may include a dynamic creation of an exemplary countdown timer that can be variably set by the marketer for that thread's finalization, wherein no more customers or buyers of the initial customer or buyer (defined herein as "friends") may redeem the DVSP from that thread. One exemplary embodiment may include exemplary restrictions (not shown) such as, e.g., but not limited to, a maximum number of individuals who can redeem the DVSP from a particular thread, a random creation of an exemplary multi-tiered-value-structure to simulate an experience of a "lottery" or "raffle" effect wherein at higher tiers, offers could, for example, but not limited to, get variably more valuable. One exemplary embodiment of the invention may include an exemplary association of an exemplary point system to the first buyer based on exemplary performance metrics, such as, e.g., but not limited to, revenue generated from a DVSP or the number of individuals who have passed the DVSP to others. One exemplary embodiment of the invention may include where the computer processor-implemented method may include receiving an association of an individual's joining a thread, where the individual may indicate to the system which individual may be currently "in the action" (also know as, are joining the DVSP). According to an exemplary embodiment, the method may include tracking, or allowing the individual user to be given points or another indicia based on the individual user being credited with generating a sale closed by another individual who has joined a thread. According to an exemplary embodiment, a combination of two or more offers of an exemplary discount may be provided at an exemplary pair of exemplary separate exemplary tier level(s) and/or milestones.

One exemplary embodiment of the invention may include receiving any authorization of an individual's payment method (such as, e.g., but not limited to, a credit card) for a monetary amount (i.e. price) of the current tier a multi-tier thread is at, followed by the charging of the variable amount (tier) the thread may reach upon expiration of the dynamic countdown generated by the first buyer (creator) of the thread.

One exemplary embodiment of the invention may include marketing of specific DVSPs to individuals within a structured database of user-user social connections and optionally user interests. This ability to enable targeting of the DVSP based on characteristics of a user may enable a nonobvious possibility for a marketer to generate new customers from an exemplary later-adopter category of a given total addressable market who may be probabilistically more interested in a DVSP after a first-buyer, which the subsequent buyer(s) may consider a peer, and possibly one or several others, may have indicated the subsequent interest and may have depressed the price of entry into the thread lower, and/or increased the value of joining the thread based on a higher level value tier that the thread dynamically reached as specified by thread generator terms, etc. One embodiment of the invention may include the DVSP vendor service, which may provide the marketer, or promoter, or vendor, the ability to pay for varying levels of detail regarding the dynamics of their promotion.

One exemplary embodiment of the invention may include an exemplary dynamic modification of a given DVSP thread countdown, based on events taken against the thread. For example, the marketer (creator of the promotion) may set up an exemplary promotion to add an exemplary specific amount of time to the countdown upon determination of a new individual's joining the thread, possibly at varying points along the exemplary thread.

One exemplary embodiment of the invention may include an exemplary ability for one or more individual(s) of a certain health group, such as, e.g., but not limited to, smokers, etc., to join such a network and may then, based on their having reached certain health goals, join threads and redeem DVSPs. According to an exemplary embodiment, the method of facilitating a group's participation may create a nonobvious effect of the group's membership commiserating regarding their struggle together in a network to having reached a health goal and thereby being rewarded.

FIG. 1A depicts an exemplary view of an exemplary embodiment of an exemplary heterogeneous client device environment coupled to an exemplary network system adapted to provide a network-based promotions system architecture environment using a plurality of computing and communication devices coupled together in a distributed networked system architecture 100, according to an exemplary embodiment.

An exemplary computer system platform executing an exemplary software application program, which may reside, in an exemplary embodiment, on a user's client computing device 102, and/or on a server in interactive communication with the user's client computing device in a client/server, hierarchical, terminal server, or peer-to-peer fashion, may include, but is not limited to, a computing or communications device, desktop/laptop computers, tablet computers, personal digital assistant, telephony, smart-phone, mobile device, mobile phone, wireless device, tablet, personal digital assistant, handheld and the like, which may in an exemplary embodiment, be the device capable of providing user display or other output and receiving input from user interactive selections via any of various well known input devices, for creation of promotions by marketers of vendors, and receipt of promotional thread offerings and receipt of financial transaction authorization and transmission of final coupon for output or access upon expiration of a countdown, or for delivery of an electronic coupon through various ways via the user's computing device. According to an exemplary embodiment, various versions of the exemplary software program, which may be an applet, a standalone application program, a browser based user interface, a Java applet, among various other embodiments as will be apparent to those skilled in the art, and as discussed further below with reference to FIGS. 1A-11, according to exemplary embodiments. In an exemplary embodiment, the screen shots may be browser based interactive interfaces, or an application or applet, such as a toolbar, or browser based toolbar. In another exemplary embodiment, the toolbar may be an applet, or other application program that may be provided in any of various well known ways, such as, e.g., but not limited to, an Internet browser-based toolbar, a JAVA applet, an ANDROID application, a Windows 7 or Windows 8, etc. application program, an iPOD, iPhone, or iPAD application, a MAC OS/X application, an iOS application, or the like, etc.

Figure 1B:
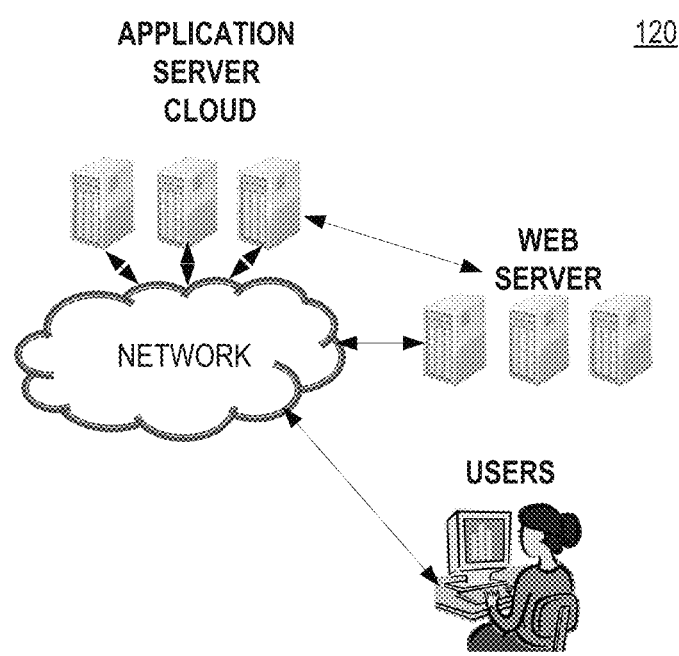
FIG. 1B depicts an exemplary embodiment of a network-based promotion system, system architecture high level diagram, according to an exemplary embodiment coupled together by an exemplary cloud-based architecture network, according to an exemplary embodiment.

FIG. 1B depicts an exemplary embodiment of a network-based promotion system, system architecture high level diagram 120, according to an exemplary embodiment coupled together by an exemplary cloud-based architecture network, according to an exemplary embodiment.

According to an exemplary embodiment an exemplary cloud/network system and software, or a remote client server topology, a world wide web based (WWW) internet browser based application, or the like application may be provided. Users as shown in diagram 120 may access applications, in an exemplary embodiment via a network illustrated by the cloud, which may include, for example web servers such as, e.g., but not limited to, domain name servers (DNS) servers capable of domain name resolution, and hyper text markup language (HTML), JAVA applications, and/or extensible markup language (XML) implemented interactive applications, as a service offering may be implemented, and may allow, e.g., but not limited to, interactive client to remote server device interaction in well known matters via various wellknown network protocols such as the internet protocol (IP) and the transmission control protocol (TCP), as well as any well known network stack implementing the various communications layers of the OSI model for standard communication between two or more computing devices. According to an exemplary embodiment, many exemplary commercial cloud service providers may be used to host an application, if not a separate server one may use a cloud based offering such as, e.g., but not limited to, Amazon, Rackspace, Microsoft and/or many others as will be apparent to those skilled in the art, offering such capabilities, or alternatively application service providers (ASPs), software as a service (SAAS) providers, etc..

Figure 1C:
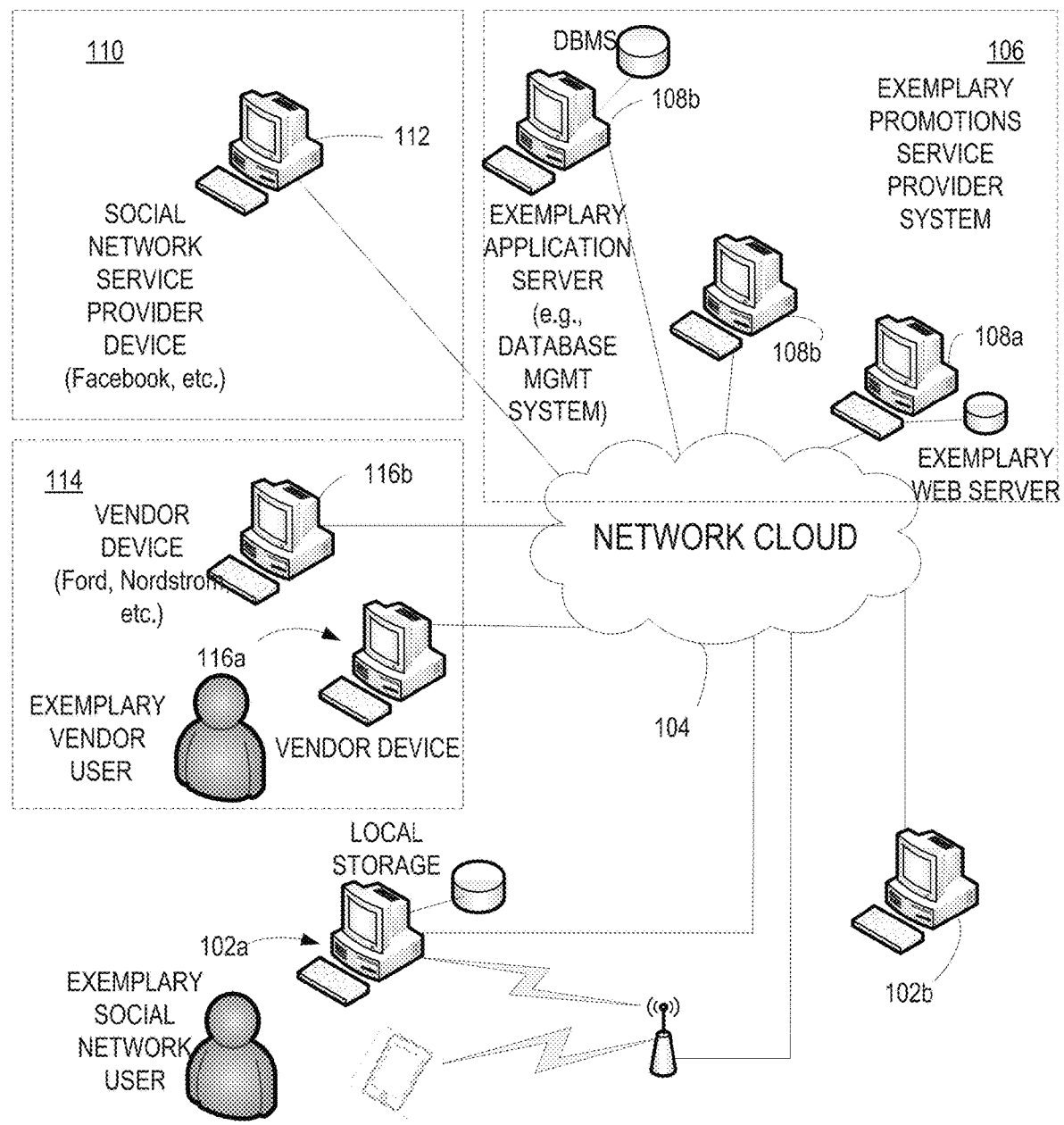
FIG. 1C depicts an exemplary embodiment of an exemplary system illustrating an exemplary distributed network environment.

FIG. 1C depicts an exemplary embodiment of an exemplary system 130 illustrating an exemplary distributed network environment, according to an exemplary embodiment. Diagram 130 of FIG. 1C illustrates an exemplary social network user devices 102a, 102b (collectively referred to as 102, e.g., a personal computer (PC), or smartphone, among other devices as illustrated in FIG. 1A above, etc.) by which a user may access a network 104 to gain access to other network resources, according to an exemplary embodiment. According to an exemplary embodiment, the user device 102 may communicate via network 104 to other user devices 102 via any of various communications applications such as, e.g., but not limited to, electronic mail systems, or a social network 110 as illustrated including social network service provider device 112 also coupled to network 104, according to an exemplary embodiment. According to various embodiments, the user devices 102 may also access an exemplary promotions service provider 106, which as illustrated may include service provider user device 108b as may be used to handle, e.g., tracking of countdowns, counters of numbers of customers agreeing to a pay for a promotion, or for processing financial transactions to, e.g., but not limited to, a bank and/or credit card service, etc. As shown, the user devices 102 may access the exemplary promotions service provider 106, via, e.g., but not limited to, a browser-based internet application, illustrated via web server 108a, which may perform such functions as providing load balancing and/or security, and/or a firewall for the service provider 106, as well as may then serve access to one or more application servers, such as, e.g., but not limited to, may include a database management system such as, e.g., but not limited to, a relational database, or other application software system, according to an exemplary embodiment. Further, as illustrated, other devices of users such as, e.g., but not limited to, marketer devices, or other vendor devices 116a, 116b (collectively 116), may be used by a marketer user as illustrated in creating or entering promotions for vendors of various goods and/or services as may be marketed using the system as disclosed, or understood by those skilled in the art, according to various embodiments of the invention. For example, a marketer or vendor device 116 may be used to create a promotion for Ford, or Nordstrom's, or any of various other goods and/or services vendors 114 interested in promoting their products and services, according to an exemplary embodiment.

Figure 1D:
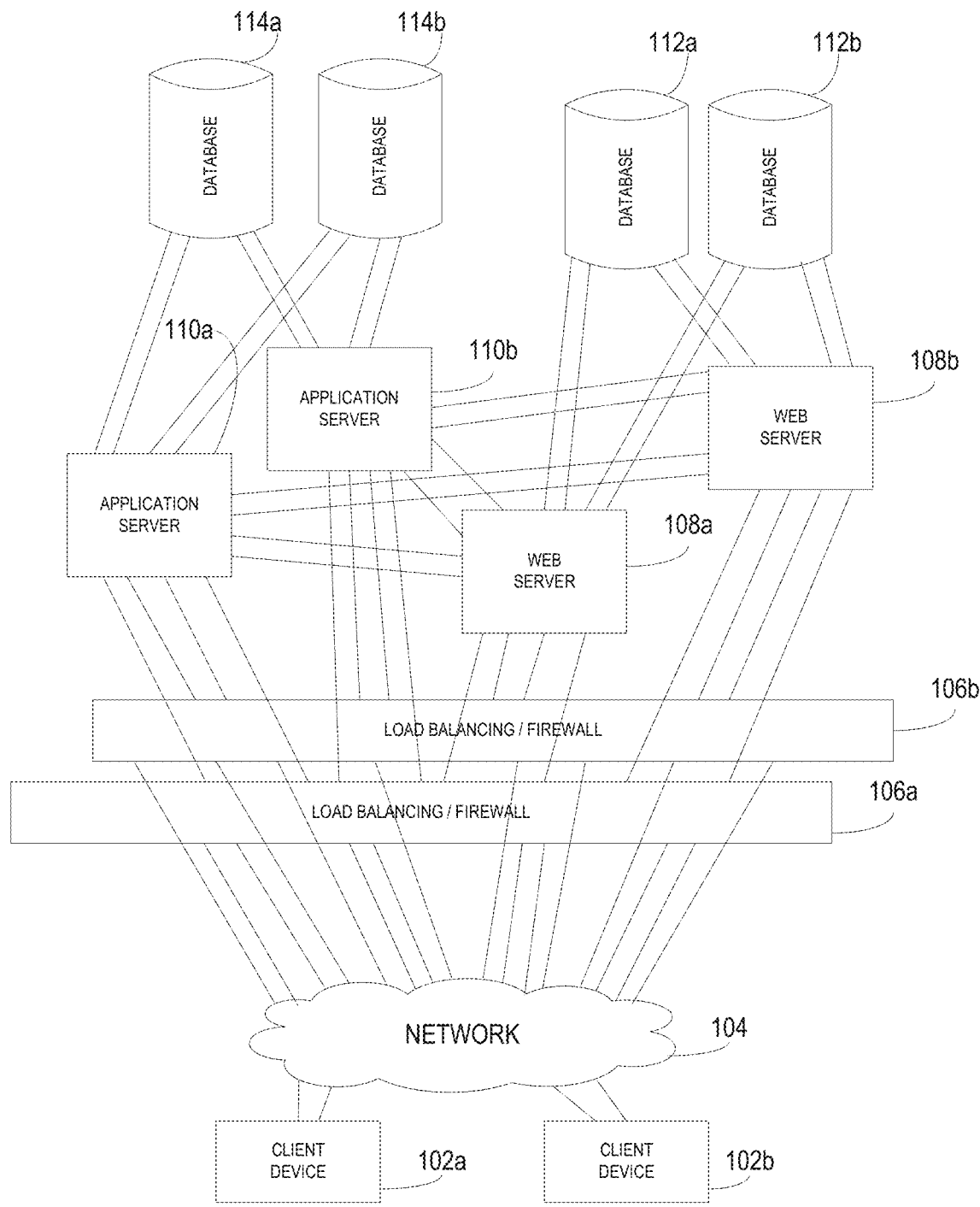
FIG. 1D depicts an exemplary embodiment of an exemplary system illustrating an exemplary network environment.

FIG. 1D depicts an exemplary embodiment of diagram 140 of an exemplary system illustrating an exemplary network environment. FIG. 1D illustrates an exemplary overview of an exemplary system as may be used in an exemplary environment according to various exemplary embodiments of the present invention. FIG. 1D depicts an exemplary embodiment of a high level system block diagram 140 that can be used to provide an exemplary system for providing a non-quantitative information search and response engine according to an exemplary embodiment of the present invention.

The high level system block diagram 140 of FIG. 1D may include, in an exemplary embodiment, users interacting with browsers on client devices 102a, or 102b (collectively 102), respectively. Browsers can be, e.g., but not limited to, application software programs executing on computer workstations or other computer processor based devices 102 (including mobile devices such as, e.g., but not limited to, communication devices, phones, smartphones, tablets, and/or computer tablets), which may be coupled via a network 104 (in wireline and/or wireless fashion) to other devices, as shown, in an exemplary embodiment. Workstations 102 can be coupled via a network 104 such as, e.g., but not limited to, an internet, and intranet, or another type of network. In an exemplary embodiment network 104 may include the global Internet. Network 104 may provide access for client devices I 02 to gain access to, e.g., but not limited to, one or more application servers 110a, 110b (collectively 110), such as, e.g., but not limited to, a database management system (DBMS). Although a client server topology is discussed any of various other well-known types of communications topologies may also be used such as, e.g., but not limited to, point-to-point, peer-to-peer, cloud-based, software as a service (SAAS), browser-based, hierarchical, distributed, and/or centralized, etc. The application server 110 can manage one or more databases (collectively 112). In an exemplary embodiment, the application server 120 can access an exemplary database(s) 114 having a plurality of data records, where in an exemplary embodiment, each data record may have one or more fields, etc.. It will be apparent to those skilled in the art, that each database 112, 114 can be part of a larger database, or could be broken into a plurality of separate subdatabases. In an exemplary embodiment of the present invention, search results can include a plurality of records obtained from the database 112, 114 that meet search criteria included in a search query. Network 104 may be coupled to any of various well known components such as, e.g., but not limited to, one or more load balancing devices or firewall devices 106a, 106b (collectively 106), web server(s) 108, application server(s) 110, routers, gateways, physical layer devices, data link layer devices, and/or network layer devices, etc.

As illustrated, web servers 108 and application servers 110 may be coupled to one another via one or more network(s) 104. Although network 104 is shown, in an exemplary embodiment, as being downstream of load balancing devices 106, it is also possible to have a network upstream of load balancing devices 104, coupling, e.g., but not limited to, application server(s) 110, web server(s) 108, and/or database(s) 112, 114, as well as other client or other server devices (not shown), local and/or remote from the depicted exemplary devices, etc. Exemplary client devices 102 are depicted downstream over an exemplary network(s) 104 from the server devices, but could easily be elsewhere in the network topology, e.g., inside, or outside a firewall. It is also important to note that network 104 is represented in cloud metaphor schematic, but various well known network devices including various well-known star-based, bus-based, or other well known network topologies may also be represented by exemplary network(s) 104.

A user interacting with a browser on workstation 102a can access the database 114a, in an exemplary embodiment by traversing several intervening networks using well known communications protocols such as, e.g., but not limited to, transmission control protocol/internet protocol (TCP/IP). Specifically, in an exemplary embodiment, the workstation 102a can be coupled via exemplary network(s) 104 including, e.g., but not limited to, a public and/or private network, and/or the global Internet to any of various exemplary website system(s), in this exemplary case, web server(s) 108a, 108b (collectively 108), which may include any of various hosting systems such as, e.g., but not limited to, a domain system, a domain name server (DNS), a domain controller system, etc. Website or webserver system 108 in an exemplary embodiment can be, e.g., but not limited to, the Pass the Deal Service Provider website available from Recovery Science LLC of MD USA. The website system 110 can include, in an exemplary embodiment, an exemplary firewall 106 coupled to, or in addition to, or integrated with, a load balancer 106a, 106b (which could alternatively run on a general purpose computer such as, e.g., web server 108a, 108b, etc.. Load balancer 106 can be coupled to an exemplary web server 108a, and 108b. Web servers 108a, 108b can be mesh coupled to one or more application servers 110a, 110b, via hardware and/or software system solutions, according to an exemplary embodiment, or via another network 104 (not shown). Each server 108, 110, may include, e.g., but not limited to, or be coupled to, one or more database(s) 112, 114. Web server(s) 108a, 108b in an exemplary embodiment, can perform load balancing functions by transferring user application requests/queries to one or more of the application servers 110a, 110b. Results of the exemplary requests and/or queries from database 114 can be transferred from application servers 110a, 110b through web servers 108a, 108b through the network 104 to workstation 104.

Figures 1E, 1F:
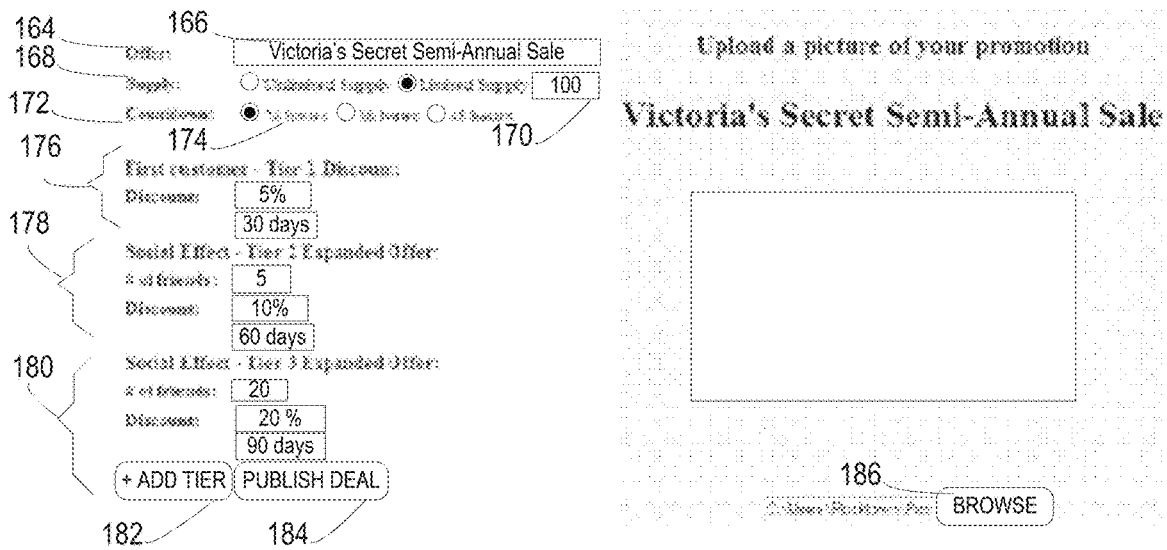
FIG. 1E depicts an exemplary embodiment of an exemplary screenshot of an exemplary user interface (UI) illustrating an exemplary application program for creating an exemplary thread generator according to one exemplary embodiment.
FIG. 1F depicts an exemplary embodiment of an exemplary screenshot of an exemplary user interface (UI) illustrating an exemplary application program of an exemplary dynamic-value coupon thread generator used to create a thread, including a mechanism by which a first customer may create a thread.

FIG. 1E depicts an exemplary embodiment of an exemplary screenshot 160 of an exemplary user interface (UI) illustrating an embodiment of an application program for creating a novel and non-obvious multi-tier promotion thread generator, according to an exemplary embodiment. According to an exemplary embodiment, a promoter may use the application program 160 of FIG. 1E, executed on a computer processor(s), to create an exemplary thread generator as illustrated. In an exemplary embodiment, the application program 160 may include various exemplary fields, many of which may be optional in some embodiments, which may be populated to create an exemplary thread generator. The promoter may select to create a thread generator for a "Version C: No commitment! Just pass the deal and make it BIGGER" thread generator 162. In creating the thread generator 160, the computer processor may prompt the promoter to interactively enter various parameters and/or requirements and/or terms and conditions in creating the thread generator.

According to an exemplary embodiment, the computer processor may be prompt 164 the promoter to enter a title 166 for the thread generator, as shown, which may be received by the computer processor and may store and/or transfer the input to a service provider server.

The computer processor may also prompt 168 the promoter to identify using, e.g., but not limited to, an exemplary radio button interface element, as shown, whether an unlimited, and/or a limited supply of threads, etc., will be available, and if a limited amount, a maximum number, e.g., in an exemplary embodiment, will be included in a given thread generator being created. Other limits may be user selectable, as will be apparent to those skilled in the art.

The computer processor may also prompt 172 the promoter to interactively identify using an exemplary radio button interface element 174, a length of time a thread countdown may be held open until expiring. According to an exemplary embodiment, the countdown 172 may be provided at any of a promoter user selectable optional three exemplary countdown time(s) (at least one time), including, e.g., but not limited to, 24 hours, 36 hours, and/or 48 hours, etc. While of course the countdown timer may be of any appropriate length of time, the time options may be optimized, e.g., to provide sufficient time to allow a first customer to notify, recruit, and encourage recruiting customers (e.g., friends or contacts) to join a thread, and to create urgency, while not being overly lengthy so as to potentially create excessive demand (as estimated by the promoter), or encourage procrastination on the part of those customers considering joining, once threads are generated. The computer processor may interactively receive the promoter's selections from fields 166, 170, 174, etc., and may create further prompts based on certain entries, such as, e.g., but not limited to, if another tier is added using interface element 182, etc. The processor may receive a response from the promoter, and may store the responses in, e.g., a database, locally and/or remotely, and/or may transfer interactive responses to the application program interface's prompts to another application or storage, according to exemplary embodiments.

The UI application program may also, as illustrated in an exemplary embodiment, allow uploading of a picture, image, or video, or other content, etc., which may be transferred by prompting 186 the user to browse and point to the filename and path of the content to be uploaded, and then the file may be uploaded and associated with the thread generator and offer.

The exemplary thread generator, as depicted in FIG. 1E may further include, e.g, but not limited to, prompts 176, 178, and 180, which as shown in an exemplary embodiment, may be adapted to create threads including exemplary two or more tiered levels (tiers) 176, 178, and 180 per thread, according to an exemplary embodiment. In one embodiment, a promoter may use the exemplary application to allow a computer processor to create a thread generator adapted to generate threads having at least two tiers in each thread, or more tiers. According to an exemplary embodiment, a promoter may use the exemplary application to allow a computer processor to create a thread generator adapted to generate threads having more than two tiers 176, 178, 179 each, by, e.g., but not limited to, including an add a tier interface element 182, a finite number, or up to an architected maximum, etc.

According to one exemplary embodiment, each discount, or thread term may include tier specific benefits, terms, parameters, requirements, numerical values, quantitative and/or qualitative values, and/or requirements for a thread to reach a given tier (an achieved tier). According to an exemplary embodiment, each specific tier of the plurality of tiers, may have tier-specific requirements, which may be mutually exclusive of one another. For example, tier-specific requirements may include a quantitative value for clarity purposes, such as, e.g., but not limited to, a minimum number of joined customers, or a range of joined customers. Certain tiers may have more terms than other tiers, such as, e.g., but not limited to, a default tier such as tier 176, may not require, in one embodiment, input of a minimum number of joined customers, since that level may include a minimum of one customer inherently. In one embodiment, each tier as noted, may be mutually exclusive of other tiers, requirements may be such that only one tier is applied upon expiration of a thread countdown. In another embodiment (not shown), tier levels may not be mutually exclusive, but rather may overlap, e.g., tier 1 may be a minimum benefit, tier 2 may be an incremental additional benefit, etc., and at expiration, based on requirements met, may issue a total benefit.

According to one exemplary embodiment, an example benefit prompt may include a discount prompt "Discount:" to prompt the promoter to enter, and for the processor to receive, store, and/or process, any tier specific discount and/or other tier-specific parameters.

The exemplary embodiment illustrates an exemplary at least three tier thread generator 160. According to an exemplary embodiment, the exemplary benefit for a given tier of the thread may include an exemplary discount, e.g., a percentage discount, e.g., but not limited to, 5%, 10%, and/or 20%, as shown in an exemplary embodiment.

Other exemplary optional benefits may include, e.g., but not limited to, cash back, additional offerings, increased value, increased redemption time, etc. Benefits may be quantitative, and/or even qualitative, but may generally increase in customer perceived value (e.g., increased discount, increased benefit, etc.) with each tier to drive customer interest in joining a thread.

As shown in an exemplary embodiment, an exemplary variable validity duration term for the ultimate coupon/promotional voucher, may be an exemplary tier-specific term, as shown (e.g., but not limited to, 30 day validity, 60 day validity, 90 day validity, etc.). Other, or alternative terms may be included, or not included, according to various exemplary embodiments of example creators of example thread generators.

According to an exemplary embodiment, an example validity time prompt may be used to prompt by the processor the promoter to enter, and for the processor to receive, store and/or process, any tier specific validity time prompt. In one embodiment, a validity time prompt may be provided, as shown in screen 160 and illustrated further in tier specific terms 196 of example thread generator 190 described below with reference to FIG. 1F, which may be used to allow the promoter to enter a time period (e.g., 30, 60, 90 days) for which each of the exemplary specific thread requirements or parameters, as well as any thread-specific and/or tier-specific fields as may be used to track the discount levels associated with each of the exemplary three tiers of the exemplary thread generator, in an exemplary embodiments.

According to an exemplary embodiment, an example requirement term prompt "# of friends:" may be provided as shown, which may allow a promoter to enter, and for the processor to receive, store, and/or process, any exemplary tier-specific requirement, criterion, or criteria, value for a thread to reach a given tier. Generally, requirement prompts may be quantitative and measurable.

As shown, in the exemplary embodiment, the second tier 178 and third tier 180 may include, e.g., but not limited to, a prompt adapted for the processor to output or display to; and/or an associated input field adapted for the computer processor to receive from; the promoter an exemplary minimum level of numbers of customer users needed to qualify as the next tier. According to an exemplary embodiment, each exemplary tier may be mutually exclusive of one another. For example, as shown, if 1-4 users join the thread prior to the thread's expiration, then tier one may be the tier applied at countdown timer expiration/close (i.e., the time when new customers can no longer join a given thread). Similarly, if 5-19 customers join, then tier 2 may be the applied discount tier upon exemplary countdown expiration, based on the settings shown for the exemplary thread. Further, similarly, if 20 or more customers have joined, in the example, then exemplary tier 3 may be the applied tier upon expiration of the exemplary countdown as shown. Thus each range of a given tier may be mutually exclusive of another tier, i.e., there may be no overlap of the tiers, in one exemplary, but nonlimiting embodiment. Thus, upon expiration of the thread countdown in this exemplary embodiment, only one tier may apply and promotional vouchers/coupons may be issued based on the applied tier level based on the requirements met at expiration (e.g., the number of joining customers). In an alternative embodiment tiers may instead not be mutually exclusive, and may instead be set up to be aggregative, i.e., a first tier may be considered a base deal benefit to be applied, and each higher tier may add an incremental benefit to a total benefit (not shown).

According to an exemplary embodiment, publish deal 184 may be used to create the thread generator by the promoter, once the thread generators' terms including the plurality of tiers 176, 178, and 180, including the tier-specific benefit parameters, the tier-specific requirements, and the thread expiration countdown timer 172 value, according to one exemplary embodiment, have been entered, and received by the computer processor, and the processor upon receiving the publish the deal 184 indication may then publish a thread generator as depicted and described further with respect to FIG. 1F, below.

FIG. 1F depicts an exemplary embodiment of an exemplary screenshot 190 of an exemplary user interface (UI) illustrating an exemplary application program illustrating an exemplary dynamic-value coupon thread generator 192 as may be used by a first customer user to create a thread, i.e., including a mechanism to instantiate a first thread associated with the thread generator, for the first user. As may be understood, other "first users" may also use the thread generator 192 to create their own respective thread based on the thread generator as created by the promoter as illustrated in FIG. 1E.

According to one exemplary embodiment, the exemplary dynamic-value coupon thread generator 192 may include program logic which may cause one or more computer processors to display a dynamic-value coupon thread generator 192, as shown in 190. According to an exemplary embodiment, as discussed above with reference to FIG. 1E, a promoter may according to an embodiment, respond to prompts generated by the one or more computer processors to create the dynamic-value coupon thread generator (thread generator) 192 (FIG. 1F). According to one exemplary embodiment, the exemplary dynamic-value coupon thread generator 192 may include program logic which may cause one or more computer processors to capture, process, and/or display a thread generator title 194: (example shown)

---

Nordstrom Semi-Annual Sale - Dynamic Value Coupon Thread Generator

---

According to one exemplary embodiment, the exemplary dynamic-value coupon thread generator 192 may include program logic which may cause one or more computer processors to capture, process, and/or display one or more tiered terms 196, 191 that, at any given time, may be used by the processor to determine for a particular thread generated by the thread generator 192, which benefit 193 tier 176, 178, 180 of a given plurality of tiers a thread may have been reached at a point in time, based on the given requirement 195 value, such as, e.g., but not limited to, a number of individuals who have successfully joined the thread at that time: (example)

---

Deal Thread Terms

| Tier | Discount (Benefit) | # of customers needed in the thread (Requirements) |
|---|---|---|
| 1 | 5% off coupon, valid for 30 days | 1 |
| 2 | 10% off coupon, valid for 60 days | 5 |
| 3 | 20% off coupon, valid for 90 days | 20 |

---

According to one exemplary embodiment, the exemplary dynamic-value coupon thread generator 192 may include program logic which may cause one or more computer processors to capture, process, and/or display at least one time value 197, which may be used to dynamically generate, and start a computer processor executed countdown timer specific to each thread that is generated by the computer processor for a de-novo customer (a customer that is starting a fresh new thread, at tier 1, being the first customer on the thread). Thus, a new thread is created by the thread generator 192 for a first customer. As discussed further herein, the first customer may then seek to have friends and contacts (other customers) join that first customer's thread, so that the thread may qualify, at thread expiration (i.e., the time when no more new customers can join the thread), for higher tier benefits by having the customers join the thread, and increasing the number of customers to reach higher levels of requirements of higher tiers. The countdown timer, in this example, a thread lifetime of 24 hours from generation, as shown in 197, will run and at expiration, i.e., completion of the 24 hour period, depending on the number of joined customers, the highest tier reached as exemplified by the number of joined customers at timer expiration, will then be applied to generate vouchers to the joined customers including the first joined customer. As shown, the time value may be compared to the thread lifetime assigned by the promoter when creating the thread generator.

According to one exemplary embodiment, the exemplary dynamic-value coupon thread generator 192 may include program logic which may cause one or more computer processors to execute the at least one countdown timer 197 for a generated thread. Upon the expiration of the countdown timer 197, the thread may expire (that is the time may arrive when no new customers can join the thread), and all customers who have joined the thread may then be issued a promotional voucher for the discount (or other benefit 193) based on the tier 176, 178, 180, that the thread reached based on the requirements 195 as defined by the deal thread terms 191. (example shown)

---

Thread lifetime: [X] 24 hours after generation
(This means you have 24 hours after you start the thread to get as many customers as possible to join the thread in order to reach higher-value tiers!)

---

According to one exemplary embodiment, the exemplary dynamic-value coupon thread generator 192 may include program logic which may cause one or more computer processors to execute to provide at least one prompt and/or way to activate (e.g., interface element, button, selection, list choice, etc.) such as, e.g., but not limited to, an exemplary mechanism "[start my thread at tier 1]" 199a, which a first customer may select, and the computer processor may receive, to use the thread generator to generate a thread by being the first customer (de novo), and founding, customer, of the thread. (example shown)

> Start your own thread: please enter your email address to be the first and founding customer of your own thread. You will right away be eligible for the Tier 1 discount, and you will receive a hyperlink that you can share with your friends to bring them to a page from which they can join your thread.
> Email address:
> [START MY THREAD AT TIER 1]

According to an exemplary embodiment, the first customer may include certain identifying indicia 199, such as, e.g., but not limited to, an electronic mail (email) address, a customer number, an identifier, a social security number, a username, a primary key, etc. According to an exemplary embodiment, each first user that seeks to create a thread using the thread generator 192 may be identified by the identifying indicia, and the identifying indicia of the first user may be associated with the thread.

According to an exemplary embodiment, the first customer, which may be referred to as a de novo customer, may use the mechanism 199a to generate a dynamic-value coupon thread using the thread generator 192. By generating the thread, or creating the thread, the user may then contact, and/or share the thread with the first user's friends and contacts to encourage those other customers to join the thread. According to an exemplary embodiment, customers may continue to join the thread of the first customer until expiration of the countdown time, when a joined customer counter is then fixed and may be compared to the tier specific requirements to determine the tier to apply in issuing coupons and/or promotional vouchers.

According to an exemplary embodiment, the system may provide the first customer, or the de novo customer a credential and/or identifier for the thread created for the first user, to allow the first user to have its computer processor share with peers to bring them to a page from which they can join the thread. (example shown)

Figure 7A:
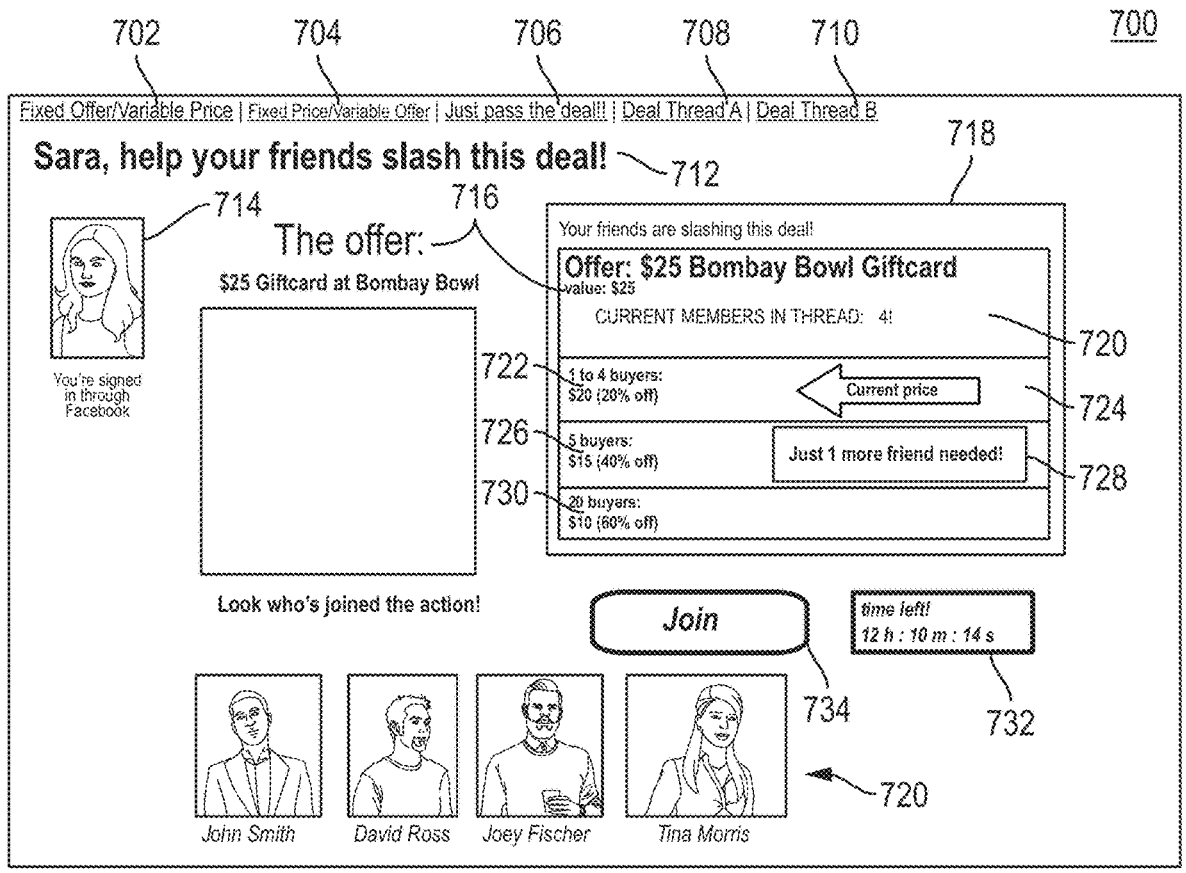
FIG. 7A depicts a diagram of an exemplary embodiment of an exemplary environment illustrating an exemplary user interface mockup of an exemplary dynamic value coupon/promotion thread portal application executing on a user client device, depicting an exemplary fixed offer, variable price offering, according to an exemplary embodiment.

> A hyper/ink with the relational database primary key of the thread embedded inside the URL.
> www.passadeal.com?thread=209881409882 ← 209881409882 is the primary key identifier
> This hyper/ink will bring anyone who clicks it to a DYNAMIC-VALUE COUPON THREAD PORTAL {FIG. 7A}.

Figure 2A:
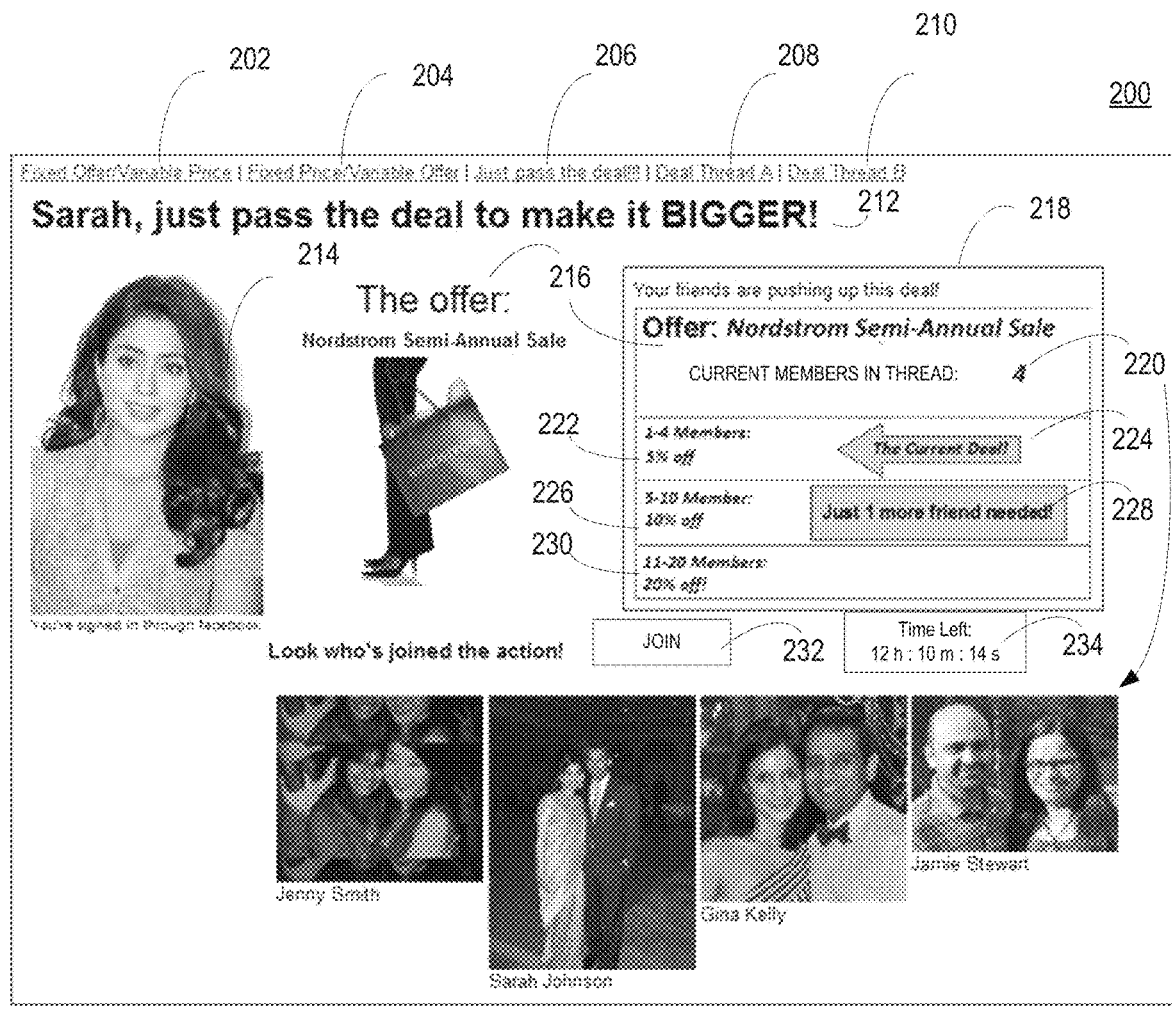
FIG. 2A depicts an exemplary embodiment of a diagram illustrating an exemplary user interface screenshot depicting an exemplary fixed offer, variable price offering dynamic-value coupon thread portal, according to an exemplary embodiment.

According to an exemplary embodiment, a hyperlink may be provided to the first customer, where the hyperlink may include an exemplary relational database primary key of the thread embedded inside the universal resource locator (URL). For example such an example URL in an exemplary embodiment, may appear as follows: "http://www.passadeal.com?thread=209881409882", where 209881409882 may be the primary key identifier associated with the particular thread associated with the first user who created the thread. According to an exemplary embodiment, this hyperlink may be used to bring any customer who clicks or otherwise activates the link to a dynamic-value coupon thread portal, such as, e.g., but not limited to, the portal depicted and described further below with reference to FIGS. 2A, 2B, 7A, and 7B, below. FIG. 2A depicts an exemplary embodiment of a diagram 200 illustrating an exemplary graphical user interface (UI) screenshot depicting an exemplary fixed offer, variable price offering dynamic-value coupon thread portal, according to an exemplary embodiment, which may be sent to a potential joining customer, by a first customer or denovo customer who has created a thread as discussed above with reference to FIG. 1E. Various optional features for an exemplary portal are depicted, but need not necessarily be included in all embodiments. For example, diagram 200 may illustrate one or more hyperlinks 202-210, an exemplary appeal to the customer being asked to join 212, the promotion title 216, which may correspond to the thread title 194 as created by a promoter when entered in the thread generator in field 166 as discussed above. The portal page may include, in an exemplary embodiment, an exemplary image 214 of the given customer to which the first user has shared the created thread. The given customer to which the first customer's thread has been offered, may be presented other content on the user's portal page. For example, an image or text illustrating and/or describing the offer itself 216 may appear based on the thread created previously, as entered by the promoter in the thread generator. In addition, the user being asked to join the thread may be provided a current number of users who have already signed up to join the multi-tiered dynamic value thread 220 (the portal page may also include, e.g., images of the previously joined users and/or their number 220, as shown, one of which may be the first user who created the thread using the thread generator). As shown, the portal may provide a view of the useful, novel, and nonobvious dynamic-value coupon thread having two or more tiers and the portal page may include display to the user of, e.g., but not limited to, potential benefit, and corresponding requirements from each specific tier 222, 226, and 230. Thus tier-specific benefits, and required joined users for each tier 222, 226, 230 may be displayed by the processor to the user. As noted, the current status of the deal 224, the current achieved tier level, 224, and/or the members in the thread and their number 220, may be depicted to illustrate the current value/benefit of the thread to the user considering joining the thread. Requirements of a specific thread may also be listed, and/or displayed as shown, with exemplary descriptions of each required threshold or milestone associated with a tier, and may include additional prompts to provide an incentive to encourage the user to join the thread, according to an exemplary embodiment. Other information such as, e.g., but not limited to, further prompts 224, 228 may be provided, displayed by the processor, to attempt to provide further encouragement to a user reviewing the thread, to consider joining the thread, according to an exemplary embodiment. The exemplary portal as depicted, according to an exemplary embodiment, may be reached, according to an exemplary embodiment, by any of various well known means, including, e.g., but not limited to, a link in an email, a social media post, and/or other embedded link or communication. The portal may further include a user interface element such as, e.g., but not limited to, a button 232, which may be used by the user to join the given thread 218 as illustrated. According to an exemplary embodiment, the time left to join the thread may be displayed to the user using a countdown timer 234 displaying an exemplary embodiment of the time left until the thread expires (i.e., until no additional users may join the thread). Any of various well know ways of indicating temporal passage, or a time duration remaining may be used, including, e.g., but not limited to, a countdown clock, a digital clock, an analog clock, an alphanumeric clock, a graphical clock, a sand clock, etc. As described, the user may receive an exemplary link or other exemplary communication that may bring the user to this portal, such as, e.g., but not limited to, an earlier described integrated thread identifier URL link, an email, post, tweet, or communication, etc., to appeal to a user if not yet joined, to encourage the user to consider joining the promotion thread, according to an exemplary embodiment.

Various other information may be displayed on the portal page, and/or provided to the user considering joining the thread such as, e.g., but not limited to, a history of other threads joined, other user profile information, additional threads the user may wish to consider joining, additional countdown indicators, expiration dates, ways to print coupons, vouchers, advertising, games, promotions, text, audio and/or video, and/or other content, etc. The portal application program and/or links to the portal, may be integrated and/or embedded into other well known collaborative environments or applications such as, e.g., but not limited to, LotusLive, Microsoft Exchange/Sharepoint, GoogleTalk, GoogleVoice, Skype, Facetime, Google+, and/or video teleconferencing, Voxeo, SalesForce.com, CRM systems, etc., and/or other network environments, social media environments, communications environments, and/or collaborative environments. Thus, the illustration of exemplary fixed images, and/or exemplary arrangements of the exemplary portal is merely exemplary, but nonlimiting, as video means, an audio appeal, or a video stream and/or other content may also be used to encourage participation or to depict other users/friends/contacts of the portal's user, who may be participating, may be considering participating, or may be interested in such offerings, etc., according to various exemplary embodiments.

As will be understood, though not shown, according to another exemplary embodiment, the first user may be provided the first user's own portal page, which may, according to an exemplary embodiment depict a current status of the promotion thread and may permit the first user to potentially invite additional users to consider joining, and/or provide other content and/or other potential thread generators that the user may consider creating additional threads from as a first user.

Figure 2B:
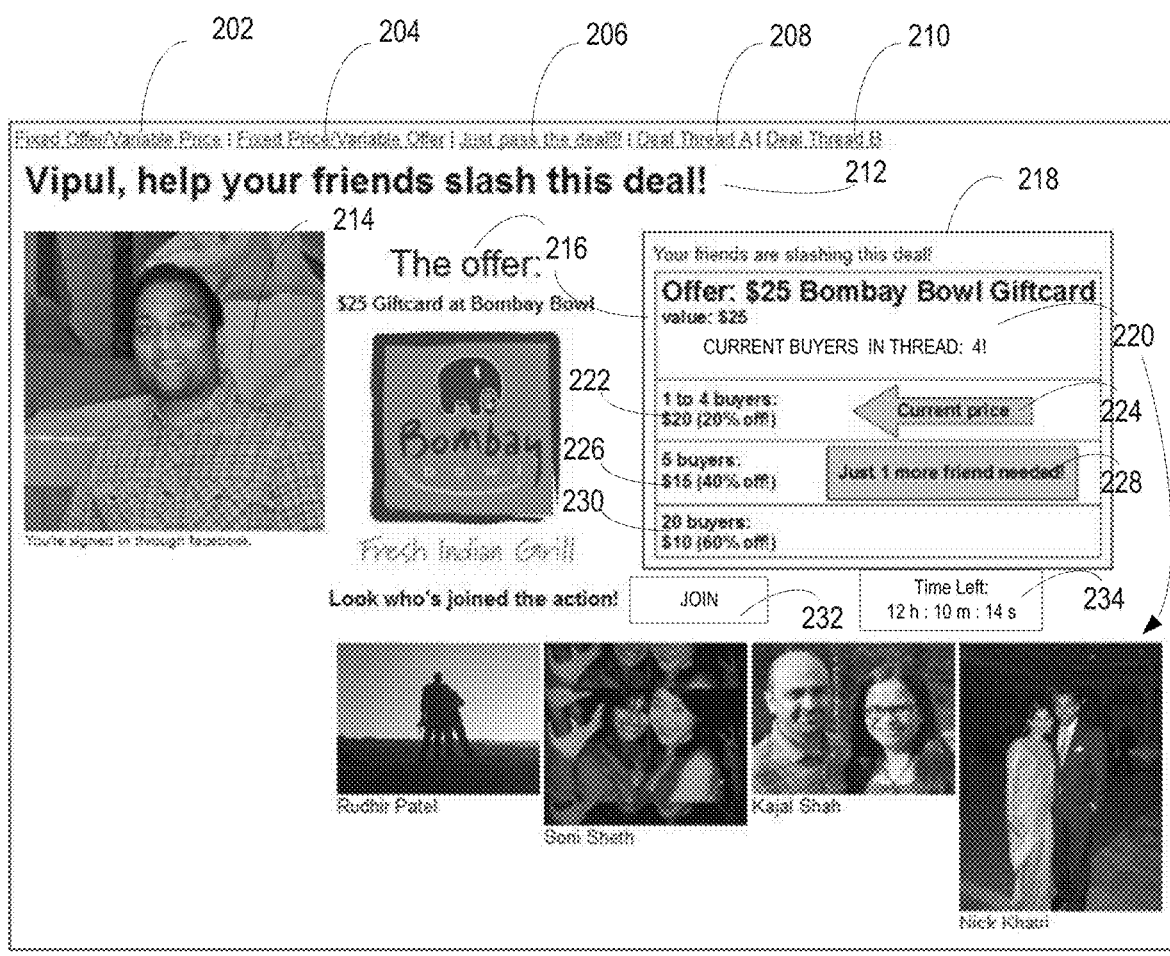
FIG. 2B depicts an exemplary embodiment of a diagram illustrating an exemplary user interface screenshot depicting an exemplary fixed price, variable offering dynamic-value coupon thread portal, according to an exemplary embodiment.

FIG. 2B depicts an exemplary embodiment of a diagram 232 illustrating an exemplary user interface screenshot depicting an exemplary fixed price, variable offering, dynamic-value coupon thread portal according to an exemplary embodiment, which may be send to a potential joining customer, by a first customer or de novo customer who has created a thread as discussed above with reference to FIG. 1E. Various optional features for an exemplary portal are depicted, but need not necessarily be included in all embodiments. For example, diagram 232 may illustrate one or more hyperlinks 202-210, an exemplary appeal to the customer being asked to join 212, the promotion title 216, which may correspond to the thread title 194 as created by a promoter when entered in the thread generator in field 166 as discussed above. The portal page may include, in an exemplary embodiment, an exemplary image 214 of the given customer to which the first user has shared the created thread. The given customer to which the first customer's thread has been offered, may be presented other content on the user's portal page. For example, an image or text illustrating and/or describing the offer itself 216 may appear based on the thread created previously, as entered by the promoter in the thread generator. In addition, the user being asked to join the thread may be provided, according to an embodiment, a current number of users who have already signed up to join the multi-tiered dynamic value thread 220 (the portal page may also include, e.g., images of the previously joined users and/or their number 220, as shown, one of which may be the first user who created the thread using the thread generator). As shown, the portal may provide a view of the useful, novel, and nonobvious dynamic-value coupon thread having two or more tiers and the portal page may include display to the user of, e.g., but not limited to, potential benefit, and corresponding requirements from each specific tier 222, 226, and 230. Thus tier-specific benefits, and required joined users for each tier 222, 226, 230 may be displayed by the processor to the user. As noted, the current status of the deal 224, the current tier level, 224, and/or the members in the thread and their number 220, may be depicted to illustrate the current value/benefit of the thread to the user considering joining the thread. Requirements of a specific thread may also be listed, and/or displayed as shown, with exemplary descriptions of each required threshold or milestone associated with a tier, and may include additional prompts to provide an incentive to encourage the user to join the thread, according to an exemplary embodiment. Other information such as, e.g., but not limited to, further prompts 224, 228 may be provided, displayed by the processor, to attempt to provide further encouragement to a user reviewing thread, to consider joining the thread, according to an exemplary embodiment. The exemplary portal as depicted, according to an exemplary embodiment, may be reached, according to an exemplary embodiment, by any of various well known means, including, e.g., but not limited to, a link in an email, a social media post, and/or other embedded link or communication. The portal may further include a user interface element such as, e.g., but not limited to, a button 232, which may be used by the user to join the given thread 218 as illustrated. According to an exemplary embodiment, the time left to join the thread may be displayed to the user using a countdown timer 234 displaying an exemplary embodiment of the time left until the thread expires (i.e., until no additional users may join the thread). Any of various well know ways of indicating temporal passage, or a time duration remaining may be used, including, e.g., but not limited to, a countdown clock, a digital clock, an analog clock, an alphanumeric clock, a graphical clock, a sand clock, etc. As described, the user may receive an exemplary link or other exemplary communication that may bring the user to this portal, such as, e.g., but not limited to, an email, post, tweet, or communication, etc., to appeal to a user if not yet joined, to encourage the user to consider joining or purchasing the promotion thread, according to an exemplary embodiment. Various other information may be displayed on the portal page, and/or provided to the user considering joining the thread such as, e.g., but not limited to, a history of other threads joined, other user profile information, additional threads the user may wish to consider joining, additional countdown indicators, expiration dates, ways to print coupons, vouchers, etc. The portal application program and/or links to the portal, may be integrated into and/or embedded other well known collaborative environments or applications such as, e.g., but not limited to, LotusLive, Microsoft Exchange/Sharepoint, GoogleTalk, GoogleVoice, Skype, Facetime, Google+, and/or video teleconferencing, Voxeo, SalesForce.com, CRM systems, etc., and/or other network environments, social media environments, communications environments, and/or collaborative environments. Thus, the illustration of exemplary fixed images, and/or exemplary arrangements of the exemplary portal is merely exemplary, but nonlimiting as video means, an audio appeal, or a video stream and/or other content may also be used to encourage participation or to depict other users/friends/contacts of the portal's user, who may be participating, may be considering participating, or may be interested in such offerings, etc., according to various exemplary embodiments.

As will be understood, though not shown, according to another exemplary embodiment, the first user may be provided the first user's own portal page, which may, according to an exemplary embodiment depict a current status of the promotion thread and may permit the first user to potentially invite additional users to consider joining, and/or provide other content and/or other potential thread generators that the user may consider creating additional threads from as a first user.

Figure 3A:
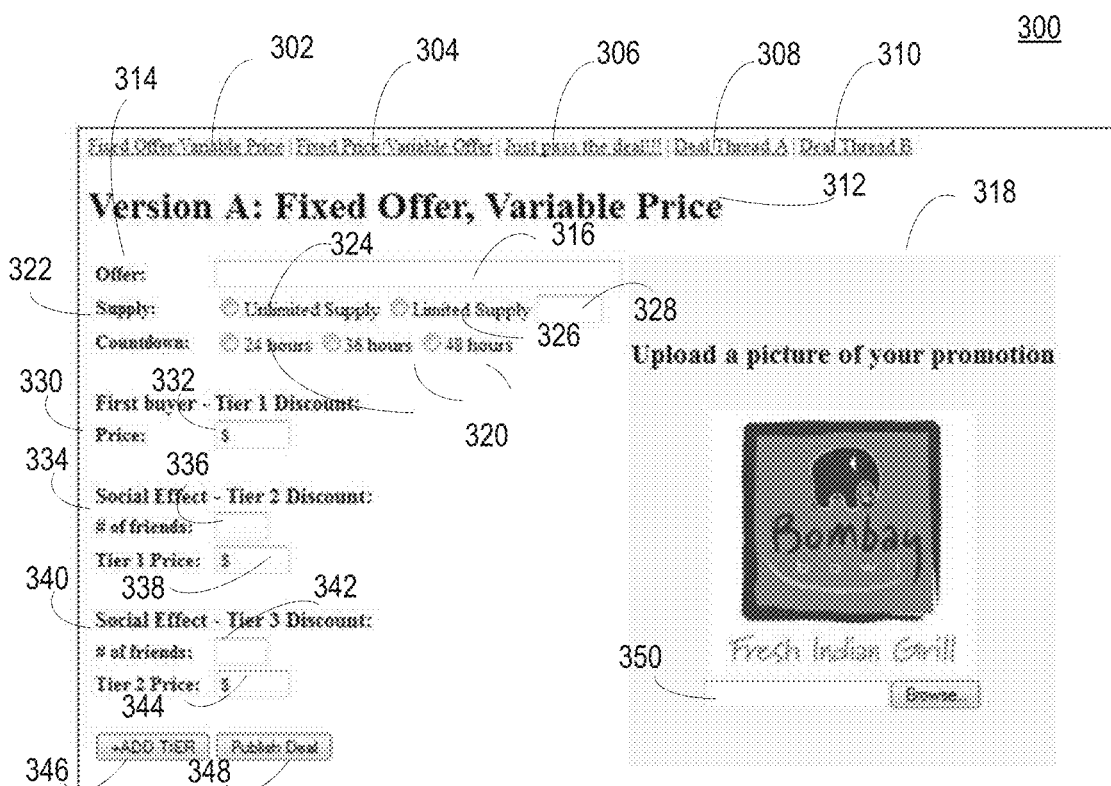
FIG. 3A depicts an exemplary embodiment of a diagram illustrating an exemplary user interface screenshot for another embodiment of an exemplary user interface application program as the method described with reference to FIG. 1E above, for creating a dynamic value social promotion (DVSP), depicting creation of an exemplary fixed offer, variable price thread generator, according to an exemplary embodiment.
Figure 6A:
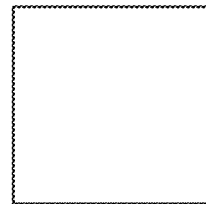
FIG. 6A depicts another exemplary embodiment of a diagram 600 illustrating an exemplary user interface screenshot depicting an exemplary interface for creating a fixed offer, variable price dynamic value multi-tiered coupon thread generator according to an exemplary embodiment.

FIG. 3A depicts an exemplary embodiment of a diagram 300 illustrating an exemplary user interface screenshot for an other embodiment of an exemplary user interface application program as the method described with reference to FIG. lE above, for creating a dynamic value social promotion (DVSP), depicting creation of an exemplary fixed offer, variable price thread generator, according to an exemplary embodiment. Diagram 300 as illustrated may include one or more hyperlinks as illustrated by 302-310, a description of the type of thread generator being created 312, in this case a fixed offer, variable price offering thread generator has been chosen by an exemplary promoter user (e.g., a vendor user, a marketer user, and/or a promotion service provider user, etc.), e.g., selected by a link such as, e.g., 302 from another screen, according to an exemplary embodiment. The graphical user interface of the application program may include one or more prompts such as offer prompt 314, and user interactive fields 316 for receiving exemplary alphanumeric text from the promoter user (i.e., promotion service provider user, vendor user and/or marketer user) interacting with the application program, according to an exemplary embodiment. The program interface may prompt for a supply indication 322, which may indicate a limited number of threads which may be generated from the thread generator being created, and may provide exemplary radio buttons 324, 326, or other interface elements, to allow the computer processor to receive a user selection of, e.g., but not limited to, an unlimited supply, or a limited supply, and/or a text (e.g., numeric) indication 328, as well as a novel and nonobvious countdown indication associated with the multi-tier dynamic value thread being generated by the thread generator, with user selectable time period radio buttons 320, according to an exemplary embodiment. A plurality of tiers 330, 334, 340 are illustrated with exemplary prompts 322, 330, 334, 340, and fields 332, 336, 338, 342, 344, to be completed by the promoter may be displayed by the computer processor, according to an exemplary embodiment. If the promoter user wishes to add additional tiers to the plurality of default tiers (in the exemplary embodiment 3 or more, but could be 2 or more), an add tier button 346 may be provided enabling the computer processor to receive an indication to add an additional tier to the thread generator. According to an exemplary embodiment, various terms may be received, stored and/or processed by the computer processor from the promoter creating the thread generator, including e.g., but not limited to, benefit amounts or values, as well as requirements or milestones for meeting the thresholds of each specific tier, such as, e.g., but not limited to, the variation in price or discount as shown in 332, 338, 344 or change in requirement such as shown in 336, and 342, according to an exemplary embodiment. Additional tiers may be added with 346, and the thread generator may be published with 348, according to an exemplary embodiment. The marketer user may further upload an image or other content as shown in FIG. 3A element 350, for example, for use in the thread generator application as illustrated in FIG. 1F. An example of a completed exemplary creation of thread generator is depicted in FIG. 6A.

Figure 3B:
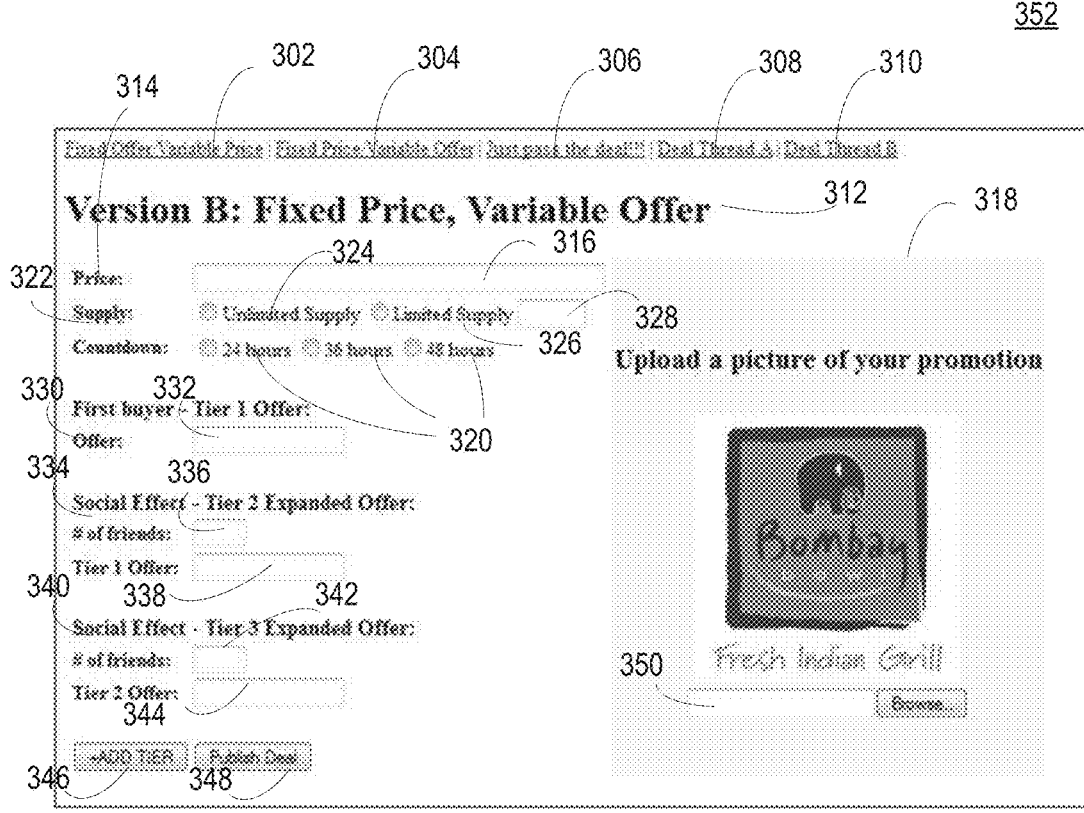
FIG. 3B depicts an exemplary embodiment of a diagram illustrating an exemplary user interface screenshot depicting another exemplary embodiment of an exemplary user interface application program as the method described with reference to FIG. 1E above, for creating a dynamic value social promotion (DVSP), depicting creation of an exemplary fixed price, variable offer thread generator, according to an exemplary embodiment.
Figure 6B:
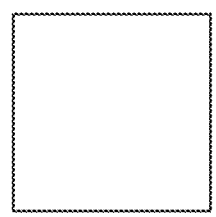
FIG. 6B depicts an exemplary embodiment of a diagram 620 illustrating an exemplary user interface screenshot depicting an exemplary interface for creating a fixed price, variable dynamic value multi-tiered coupon thread generator, according to an exemplary embodiment.

FIG. 3B depicts an exemplary embodiment of a diagram 352 illustrating an exemplary user interface screenshot depicting another exemplary embodiment of an exemplary user interface application program as the method described with reference to FIG. 1E above, for creating a dynamic value social promotion (DVSP), depicting creation of an exemplary promoter user interface for interactively creating an exemplary fixed price, variable offer thread generator, according to an exemplary embodiment. Diagram 352 as illustrated may include one or more hyperlinks as illustrated by 302-310, a description of the type of thread generator being created 312, in this case a fixed price, variable offer offering thread generator has been chosen by an exemplary promoter user (e.g., a vendor user, a marketer user, and/or a promotion service provider user, etc.), e.g., selected by a link such as, e.g., 304 from another screen, according to an exemplary embodiment. The graphical user interface of the application program may include one or more prompts such as offer prompt 314, and user interactive fields 316 for receiving exemplary alphanumeric text from the promoter user (i.e., promotion service provider user, vendor user and/or marketer user) interacting with the application program, according to an exemplary embodiment. The program interface may prompt for a supply indication 322, which may indicate a limited number of threads which may be generated from the thread generator being created, and may provide exemplary radio buttons 324, 326, or other interface elements, to allow the computer processor to receive a user selection of, e.g., but not limited to, an unlimited supply, or a limited supply, and/or a text (e.g., numeric) indication 328, as well as a novel and nonobvious countdown indication associated with the multi-tier dynamic value thread being generated by the thread generator, with user selectable time period radio buttons 320, according to an exemplary embodiment. A plurality of tiers 330, 334, 340 are illustrated with exemplary prompts 322, 330, 334, 340, and fields 332, 336, 338, 342, 344, to be completed by the promoter may be displayed by the computer processor, according to an exemplary embodiment. If the promoter user wishes to add additional tiers to the plurality of default tiers (in the exemplary embodiment 3 or more, but could be 2 or more), an add tier button 346 may be provided enabling the computer processor to receive an indication to add an additional tier to the thread generator. According to an exemplary embodiment, various terms may be received, stored and/or processed by the computer processor from the promoter creating the thread generator, including e.g., but not limited to, benefit amounts or values, as well as requirements or milestones for meeting the thresholds of each specific tier, such as, e.g., but not limited to, the variation in offer as shown in 332,338, and 344, or change in requirement such as shown in 336, and 342, according to an exemplary embodiment. Additional tiers may be added with 346, and the thread generator may be published with 348, according to an exemplary embodiment. The promoter user may further upload an image or other content as shown in FIG. 3B element 350, for example, for use in the thread generator application as illustrated in FIG. 1F. An example of a completed exemplary creation of thread generator is depicted in FIG. 6B.

Figure 3C:
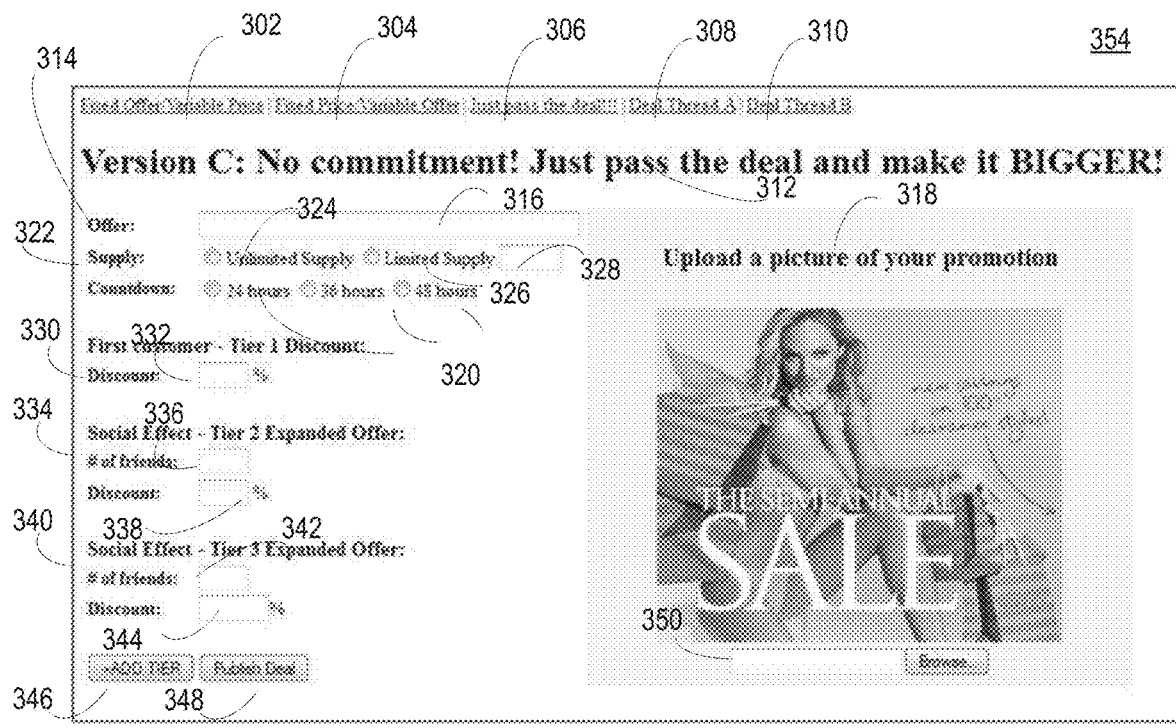
FIG. 3C depicts an exemplary embodiment of a diagram illustrating an exemplary user interface screenshot depicting another exemplary embodiment of an exemplary user interface application program as the method described with reference to FIG. 1E above, for creating a dynamic value social promotion (DVSP), depicting creation of an exemplary no commitment, just pass the deal and make it bigger exemplary promotion thread generator, according to an exemplary embodiment.

FIG. 3C depicts an exemplary embodiment of a diagram 354 illustrating an exemplary user interface screenshot depicting another exemplary embodiment of an exemplary user interface application program as the method described with reference to FIG. 1E above, for creating a dynamic value social promotion (DVSP), depicting creation of an exemplary no commitment, just pass the deal and make it bigger exemplary promotion thread generator, according to an exemplary embodiment. Similarly to FIG. 3A and 3B above, FIG. 3C may be used to create a thread generator according to an exemplary embodiment, in an exemplary embodiment. Similar to FIG. 3A and FIG. 3B, FIG. 3C may include tier specific discount percentage prompts 338, and input fields 332, 338, 344, and unlike FIG. 3B, no price 316 need be provided, but instead an offer description field 316 may be provided, but otherwise 354 may be similar to 300 and 352, according to an exemplary embodiment, and thus not all elements may be labeled. Thus, a promoter may use an application 300, 352, 354, (and/or 160) to create a thread generator according to various exemplary embodiments of the present invention.

Figure 4A:
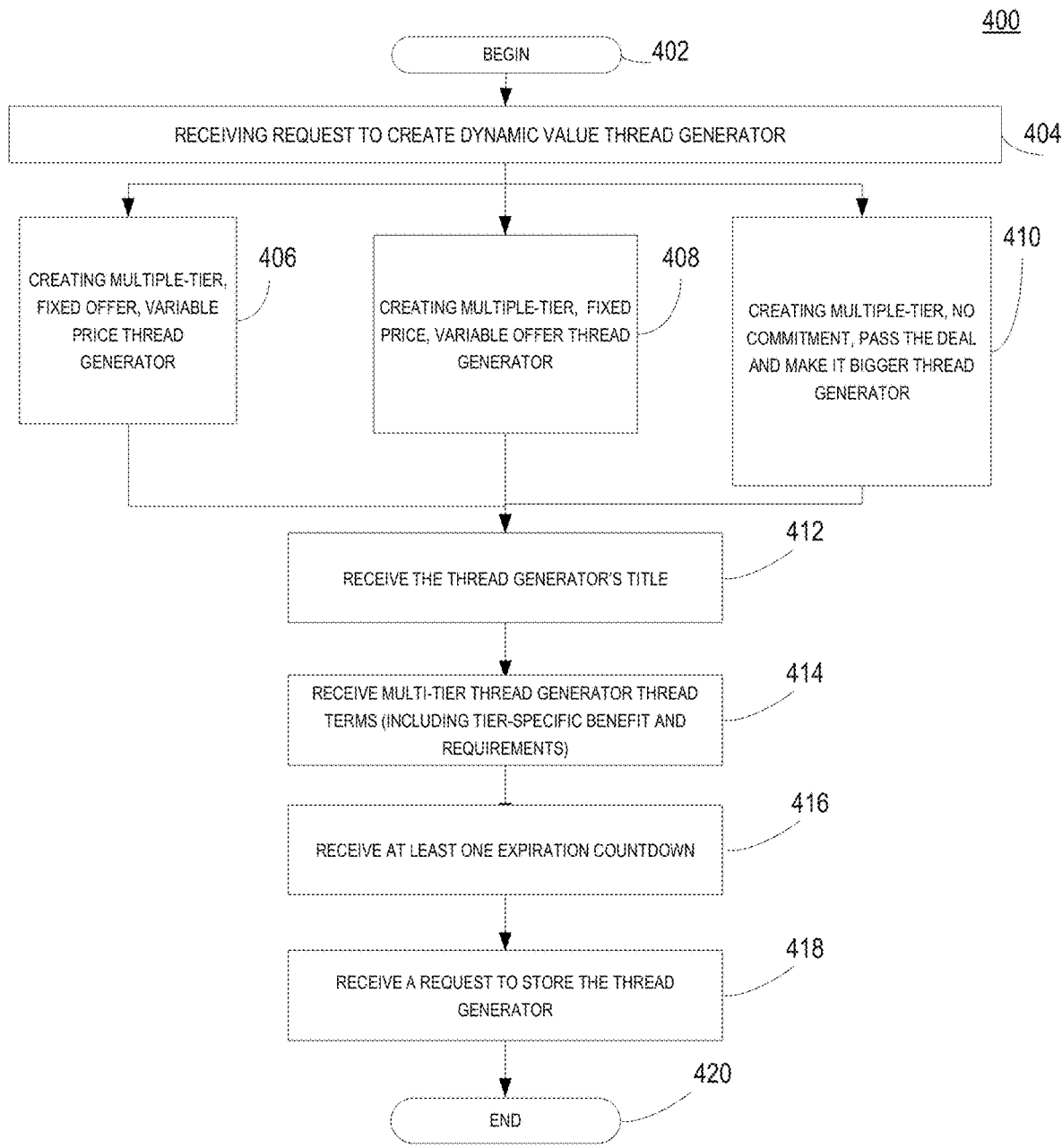
FIG. 4A depicts an exemplary flow diagram, according to an exemplary embodiment illustrating an exemplary process of creating a thread generator by a promoter, according to an exemplary embodiment.

FIG. 4A depicts an exemplary flow diagram 400, according to an exemplary embodiment illustrating an exemplary process of creating a thread generator by a promoter.

Flow diagram 400 may begin as shown, in an exemplary embodiment with 402, and may continue immediately with 404, in an exemplary embodiment.

In 404, a device of a promoter user, such as, e.g., but not limited to, a vendor user, a marketer user, and/or a promotion service provider user, working on behalf of, e.g., but not limited to, a vendor, a manufacturer, a business, and/or a service provider, etc., may select a link or other way of executing a program on at least one computer processor, to request that the at least one computer processor create an exemplary dynamic-value coupon thread generator, according to one exemplary embodiment. The computing device may accept the request to create a dynamic-value coupon thread generator and according to an exemplary embodiment flow diagram 400 may continue by prompting (not shown) the promoter user to select the type of dynamic-value coupon thread generator that the promoter wants to create and may branch and/or link to the exemplary selected type of dynamic-value coupon thread generator desired 406, 408, or 410 (e.g., the prompt and user selection is not shown, to branch to e.g., 406, 408, or 410, etc.).

If creating a multiple tier fixed offer, variable price promotion dynamic-value coupon thread generator is desired by the promoter, then flow diagram 400 may continue with 406, in an exemplary embodiment. If creating a multiple tier fixed price, variable offer promotion dynamic-value coupon thread generator is desired by the promoter, then flow diagram 400 may continue with 408, in an exemplary embodiment. Also, if creating a multiple tier no commitment, pass the deal and make it bigger promotion dynamic-value coupon thread generator is desired by the promoter, then flow diagram 400 may continue with 410, in an exemplary embodiment.

In 406, the method may create a multiple tier fixed offer, variable price promotion dynamic-value coupon thread generator and, then flow diagram 400 may continue with 412, in an exemplary embodiment.

In 408, the method may create a multiple tier fixed price, variable offer promotion dynamic-value coupon thread generator and, then flow diagram 400 may continue with 412, in an exemplary embodiment.

In 410, the method may create a multiple tier no commitment, pass the deal and make it bigger promotion dynamic-value coupon thread generator and, then flow diagram 400 may continue with 412, in an exemplary embodiment.

According to an exemplary embodiment, the computing device may next, beginning with exemplary elements 412-416 receive various exemplary input thread terms and promoter dynamic-value coupon thread generator selections of the promoter user from, e.g., a GUI as illustrated and described further above with reference to FIGS. 3A-3C, in an exemplary embodiment. According to an exemplary embodiment, various deal terms may be similar regardless of which type of thread generator is being created.

In 412, the computing device may receive (and/or store) the thread generator's title for the thread generator being created from the promoter user. From 412, flow diagram 400 may continue with 414, in an exemplary embodiment.

In 414, the computing device may receive (and/or store) multi-tier thread generator thread terms (including, e.g., tier-specific benefit and tier-specific requirements). From 414, flow diagram 400 may continue with 416, in an exemplary embodiment.

In 416, the computing device may receive (and/or store) at least one expiration count down timer term providing, e.g., but not limited to, a time duration between initialization of a thread and expiration of the countdown timer (i.e., the time after which no additional customer users may join the thread). From 416, flow diagram 400 may continue with 418.

In 418, the computing device may receive (and/or store) thread generator for later instantiation as a thread). From 418, flow diagram 400 may continue with 420 and may immediately end, according to one exemplary embodiment.

Figure 4B:
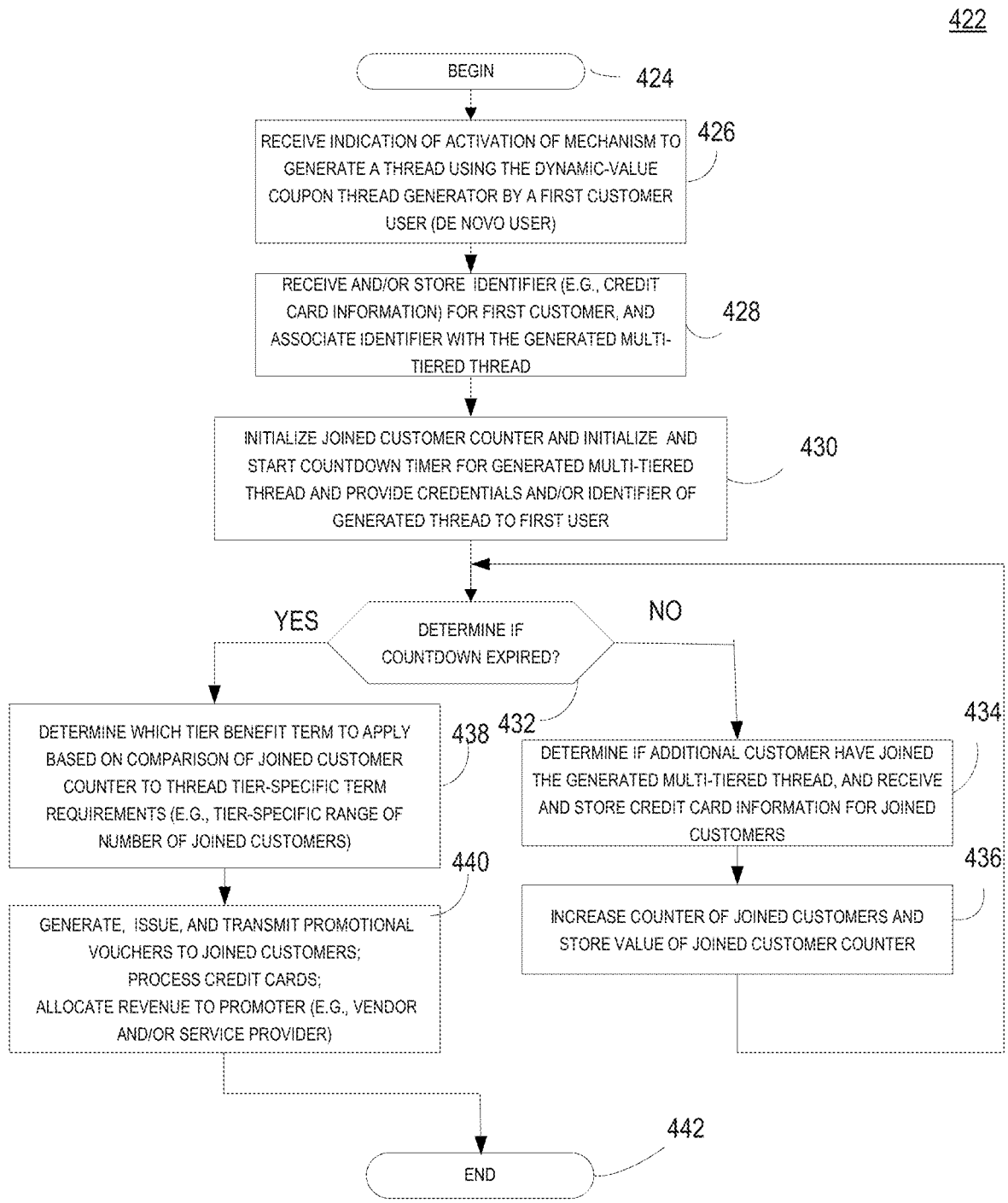
FIG. 4B depicts an exemplary flow diagram, according to an exemplary embodiment illustrating an exemplary process of generating a thread using the thread generator of FIG. 4A, for a first customer user, and for initializing and executing the generated thread, according to an exemplary embodiment.

FIG. 4B depicts an exemplary flow diagram 422, according to an exemplary embodiment illustrating an exemplary process of generating a thread using the thread generator of FIG. 4A for a first customer user, and for initializing and executing the generated thread, according to an exemplary embodiment.

Flow diagram 422 may begin as shown with 424, and may continue immediately with 426, in an exemplary embodiment.

In 424, a computing device may receive an indication of activation of a mechanism to generate a thread using a dynamic-value coupon thread generator as created by the process 400 described with reference to FIG. 4A above. According to an exemplary embodiment, the thread generator may be used by a first customer user to generate a thread. In one embodiment, the thread may be generated by receiving identifying information of the first user such as, e.g., but not limited to, an identifier, a customer identifier, a credit card number, a social security number, a data base primary key, and/or a customer number, etc. From 426, flow diagram 422 may continue with 428.

In 428, the computing device may receive (and/or store) the customer identifier provided by the first customer user, and may associate the identifier with the generated multi-tiered thread. The identifying information about the first user received in one embodiment may include identifying information of the first user such as, e.g., but not limited to, an identifier, a customer identifier, a credit card number, a social security number, a data base primary key, and/or a customer number, etc. The identifying information may be associated with the exemplary thread generated using the thread generator described above, in one exemplary embodiment. Alternatively, a unique identifier for the generated thread may be associated with the identifying information of the first user. From 428, flow diagram 422 may continue with 430, in an exemplary embodiment.

In 430, the computing device may initialize a joined customer counter at one representing the first user, and may start a countdown timer per the thread generator's countdown timer expiration duration setting, according to an exemplary embodiment. In an exemplary embodiment, credentials may be provided to the first customer user, and/or an identifier of the generated thread, and/or an exemplary URL link may be provided to the first user for sharing with contacts and/or friends as described further with reference to FIG. 4C, according to an exemplary embodiment. From 430, flow diagram 422 may continue with 432.

In 432, it may be determined by the computing device whether the countdown timer has expired yet. In the event of countdown timer expiration, then flow diagram 422 may continue with 438, and if the countdown has not yet expired, then flow diagram 422 may continue with 434.

In 434, the computing device may determine if any additional customer users have joined the generated thread, and if so, then may receive and store credit card or other identifying information for the additional joining customer users, according to an exemplary embodiment. According to an exemplary embodiment, identifying information may be received (and/or stored) for the joining users. From 434, flow diagram 422 may continue with 436.

In 436, the computing device may increase a counter of joined customers and/or the valued of joined customers may be stored for later use in determining the relevant tier of the multi-tier dynamically variable value thread at countdown expiration, in an exemplary embodiment. From 436, in an exemplary embodiment, flow diagram 422 may continue with 432.

In 432, the computing device may determine whether the countdown for the multi-tiered generated thread has expired yet, in an exemplary embodiment. If the countdown has expired, then flow diagram 422 may continue with 438, or if not yet expired, then again with 434, in an exemplary embodiment.

In 434, prior to expiration of the countdown, in an exemplary embodiment, then the computing device may again detect if additional customer users have joined the offering in an exemplary embodiment, and the computing device may receive from the client device the credit card information and/or other identifying information from the joining user, and may store that information in association with the same identifier of the generated thread created when the first user generated the multi-tier dynamic value thread when the thread was initialized or instantiated from the thread generator in an exemplary embodiment. From 434, flow diagram 422 may again continue with 436, in an exemplary embodiment.

In 436, the computer processor device may increment or increase the counter for any additional joined users who have agreed to join and/or purchase the multi-tiered generated thread in an exemplary embodiment. From 436, flow diagram 422 may again continue to loop back to 432, in an exemplary embodiment, until the countdown timer has been determined to be expired (i.e., the time has arrived that no additional customer users may join the multi-tier thread).

In 438 then, in an exemplary embodiment, the computer processor device may determine which tier of the plurality of tiers of which to apply the terms including the benefit terms, which may be determined based on an exemplary comparison of the number of joined customers that joined the generated thread as tracked in the joined customer counter, i.e., the value of the joined user counter as it stood at the time of expiration of the countdown timer may be compared to the tier-specific requirements associated with each specific tier, according to an exemplary embodiment. Based on the comparison of the counter and the tier requirements, a tier benefit term value to apply may be identified based on the tier corresponding to the joined user counter value, in an exemplary embodiment. According to an embodiment, the counter value may fall within a single range associated with a single tier, and the corresponding benefit term of that single tier may be used to generate promotion vouchers, in an exemplary embodiment. From 438, flow diagram 422 may continue with 440, in an exemplary embodiment.

In 440, the computer processor device may generate, issue, and/or transmit promotional vouchers and/or coupons to joined customers, and may process the credit cards or other financial transactions to apply the terms of the achieved tier of the thread to provide the vouchers to the associated joined users, in an exemplary embodiment. In 440, any data updates and/or financial transactions necessary to affect any revenue sharing and/or allocating transactions to allocate any revenue to any promoter(s) such as, e.g., but not limited to, a vendor, a marketer, an advertiser, a manufacturer, a service provider, and/or promotion service provider, etc. are performed in an exemplary embodiment. In an embodiment, the computing device in 440 may allocate revenue to marketer, and/or the service provider, respectively, according to any agreement between such entities, if any allocation is to be done, in an exemplary embodiment. In 440, coupons and/or promotional vouchers may be generated, in an exemplary embodiment, at a time before, at the same time, or at a time after the credit cards of the users are charged, according to exemplary embodiments, and the coupons and/or vouchers may be issued to those joined users who have joined the promotional generated thread, and may include transmitting the coupon and/or voucher to the joined customer users for later redemption as with conventional coupons or vouchers (prior to coupon or voucher fulfillment or redemption expiration, in an exemplary embodiment. To be clear, the coupon fulfillment or redemption expiration is of course a different expiration time, which will be later than the expiration of the countdown timer discussed above with reference to the generated thread, in an exemplary embodiment. From 440, flow diagram 422 may continue with 442, and may immediately end, in an exemplary embodiment. Although not discussed herein, various methods of user authentication and/or validation of the financial transaction may be included in various exemplary embodiments, including for example, but not limited to, when the customer enters credit card information, 3 or 4 digit validation codes and/or credit card expiration dates may be required, and/or voice recording of confirmation of financial transactions may also be possible using such technologies as call recording and/or voice over Internet protocol (VoIP) communication call recording, according to other exemplary embodiments.

FIG. 4C depicts an exemplary flow diagram 446, according to an exemplary embodiment illustrating an exemplary process of requesting a generated thread for a first customer user, and receiving and sharing thread indicia with other users in an effort to invite other users to join the thread, according to an exemplary embodiment.

Flow diagram 446 may begin as shown with 448, and may continue immediately with 450, in an exemplary embodiment.

In 450, the computing device of a first customer user (a de novo customer) which is a networked computer of a user using an electronic collaborative environment, such as, e.g., but not limited to, electronic mail, or a social network with a plurality of contacts or friends, may receive an indication of a request to generate a thread along with the customer's identifying information (e.g., an electronic mail address, credit card information, a social security card, a username, a customer name, and/or logon credentials, etc.). The computing device may store the information and/or provide and/or transfer the information. From 450, 446 may continue with 452.

In 452, the computing device of the first customer user may send a request on behalf of the first customer or de novo customer, to generate a thread along with the customer identifier (e.g., but not limited to, credit card information, etc.) to the promoter (e.g., but not limited to, a vendor, and/or promotion service provider, etc.), or a computing device executing a dynamic value multi-tier thread generator as created as described above with reference to FIGS. 4A and 4B. From 452, 446 may continue with 454.

In 454, the first customer client computing device may then receive credentials and/or an identifier, which may be associated with a multi-tier dynamic value coupon thread generated from a promoter created multi-tier dynamic value coupon thread generator. The multi-tier dynamic value coupon thread received, may have been created as described in diagram 422 described above with reference to FIG. 4B, using a multi-tier dynamic value coupon thread generator (where the thread generator itself may have been created according to the process 400 described above with reference to FIG. 4A), according to an exemplary embodiment. The multi-tier dynamic value coupon thread may be identified by a link to the thread. Activation of the link by a user may provide to the user an opportunity to join a multi-tiered dynamic value coupon thread to obtain a coupon for a discount or value benefit for a good or service of a given vendor, for which a promoter (e.g., a marketer, the vendor, and/or a promotion service provider) may have created a multi-tiered dynamic value coupon thread generator that may be used to generate a multi-tiered dynamic value coupon thread of the promotion, in an exemplary embodiment. Thus, in 454, the client user's computing device may receive a link to the multi-tiered dynamic value coupon/promotion thread, in an exemplary embodiment. From 454, the flow diagram 446 may continue with 456, according to an exemplary embodiment.

In 456, the computing device may receive at the computing device, a selection of at least one customer user of, e.g., but not limited to, an email contact list, and/or one or more social network friends, and/or contacts of the given customer user, or a collaborative environment, or social network share request, etc. to which to provide and/or transmit the identifying indicia of the multi-tiered dynamic value coupon thread and/or link to the thread, in an exemplary embodiment. Alternatively, the computing device may share the link to a social network or other communication environment for inviting user customers to join the thread; in an exemplary embodiment. In one embodiment, a thread creation process may forward the thread link on the customer user's behalf. In another embodiment, the first customer user (de novo customer) may forward the link directly using the first customer user's computing device, without the need for transmission by the promoter, (the vendor and/or the promotion service provider), in an exemplary embodiment. The link or URL to the thread may for example be posted by the first user's interactive actions (such as, e.g., but not limited to, an exemplary share or invite feature) on a Facebook profile page, and/or in the user's timeline, and/or in a news list, etc., and/or may be tweeted via Twitter, emailed to a group of users, and/or placed as a status in Linked in environment, or the like, etc., by the computing device, in an exemplary embodiment. From 456, flow diagram 446 may continue with 458, in an exemplary embodiment.

In 458, flow diagram 446 the computing device may determine whether, in an exemplary embodiment, whether the user may have additional friends and/or contacts to which to communicate the thread, in an exemplary embodiment. If the computing device determines the customer user may have additional friends and/or contacts that the user desires to invite to join, and/or notify of the thread, then flow diagram 446 may continue to loop back to 456, in an exemplary embodiment. If instead no additional friends and/or contacts are to be notified, then flow diagram 446 may continue with 460, in an exemplary embodiment. In an alternative embodiment, the promotion may be automatically transmitted to all contacts and/or friends, in an exemplary embodiment (not shown). In another embodiment, the exemplary link to the exemplary thread may be posted on the users' desired and/or designated location, and/or an identifier in the link may associate the thread with the first customer user, if others join the thread based on the post, in an exemplary embodiment.

In 460, the computing processor device may transmit the link to thread to, e.g., but not limited to, an exemplary list of selected friends and/or contacts as may be indicated by the customer user for those friends and/or contacts to consider joining the multi-tiered dynamic value thread, in an exemplary embodiment. In another embodiment, the link to the thread may be forwarded to any and/or all friends and/or contacts of the customer user, in an exemplary embodiment. In yet another embodiment, the promotion may only be posted on a given site without an associated notice being sent to contacts, in an exemplary embodiment. From 460, flow diagram 446 may continue with 462.

In 462, flow diagram 456 may optionally, m an exemplary embodiment, display a current status of the thread in response to any first user inquiry, e.g., the thread according to an exemplary embodiment may cause the computing device to request from a database and the computing device may then provide for display of, e.g., but not limited to, a listing of various thread and/or thread status information such as, e.g., but not limited to, the current joined user count, the terms of the exemplary generated thread including e.g., but not limited to, any benefit and/or requirements of each of the plurality of tier levels of the multi-tier dynamic value coupon thread, the current tier level including, e.g., the tier benefit associated with current tier based on if the thread were to describe immediately, displaying friends that have joined the offering and/or, displaying the current countdown time until expiration of the countdown timer according to the generated thread, any friends invited and/or not yet invited, a time temporal measure or estimate of amount of time left until a coupon expires, images and/or content such as, e.g., but not limited to, text based information and/or content, and/or video teleconferencing of friends and/or contacts, an image, audio, video, or other content for the promotion, images, audio, video, webcam, or other content for friends whom have joined, etc., in an exemplary embodiment. From 462, flow diagram 446 may continue with 464, in an exemplary embodiment.

As will be apparent to those skilled in the relevant art, the thread status information discussed in 462 may be very similar to the information shared on a user customer invitation dynamic-value coupon thread portal as illustrated in FIG. 2A, for example. The computing device of the user considering joining a thread may through well known hypertext transfer protocol (http) requests and/or responses in one exemplary browser based application may open a dynamic-value coupon thread portal, when invited, to display the current status of the thread, including such information as shown for example in FIG. 2A.

In 464, the computer processor device may determine whether the countdown timer for the exemplary multi-tiered coupon thread has expired yet. If the countdown timer has expired, then flow diagram 446 may continue with 470, or if the timer has not yet expired, then flow diagram 446 may continue with 466, in an exemplary embodiment.

In 466, if the countdown timer has been determined to be not yet expired, then the computing device may determine whether there are any other customer users to invite, and if the determination is that there are no more users to invite then flow diagram 446 may continue with 468, or if it is determined by the computing device that there are more users to invite, then flow diagram 446 may continue with 456.

In 468, status may be obtained and/or provided for the thread to, e.g., but not limited to, to be displayed to the first user, in an exemplary embodiment, similarly to 462, in response to the first user's query and/or inquiry into status of the thread, in an exemplary embodiment. From 468, flow diagram 446 may continue with 464.

In 470, since the countdown may have now expired, according to an exemplary embodiment, the computer processor device(s) may perform any of a number of exemplary task to provide a coupon and/or promotional voucher for printing or mobile use of the coupon, at the applied tier level as tracked by a computer processor tracking the joined user counter value, as determined to correspond to, or to fall within a range of requirements of a given tier, or the tier level corresponding to the joined user incremented counter value for the generated dynamic-value coupon thread identified by the identifier associated with the first customer, in an exemplary embodiment. In 470, the computing device may, in one exemplary embodiment receive a client device promotional voucher adapted to be printed and/or adapted for viewing and/or display on an exemplary mobile device of the coupon and/or promotional voucher including a tier-specific benefit term applied at the tier level of the plurality of tier levels of the thread received from the promoter, based on a comparison of final joined user counter value at countdown timer expiration, as compared to thread tier-specific requirements, to determine the appropriate final tier of the thread at countdown expiration, according to an exemplary embodiment. From 470, flow diagram 446 may continue with 472, and may immediately end, in an exemplary embodiment.

FIG. 4C depicts an exemplary flow diagram 446, according to an exemplary embodiment illustrating an exemplary process 446 as may be used in one embodiment to request a generated thread for a first customer user, and enabling receiving and sharing of thread indicia with other users encouraging those users to join the thread, according to an exemplary embodiment.

Figure 5:
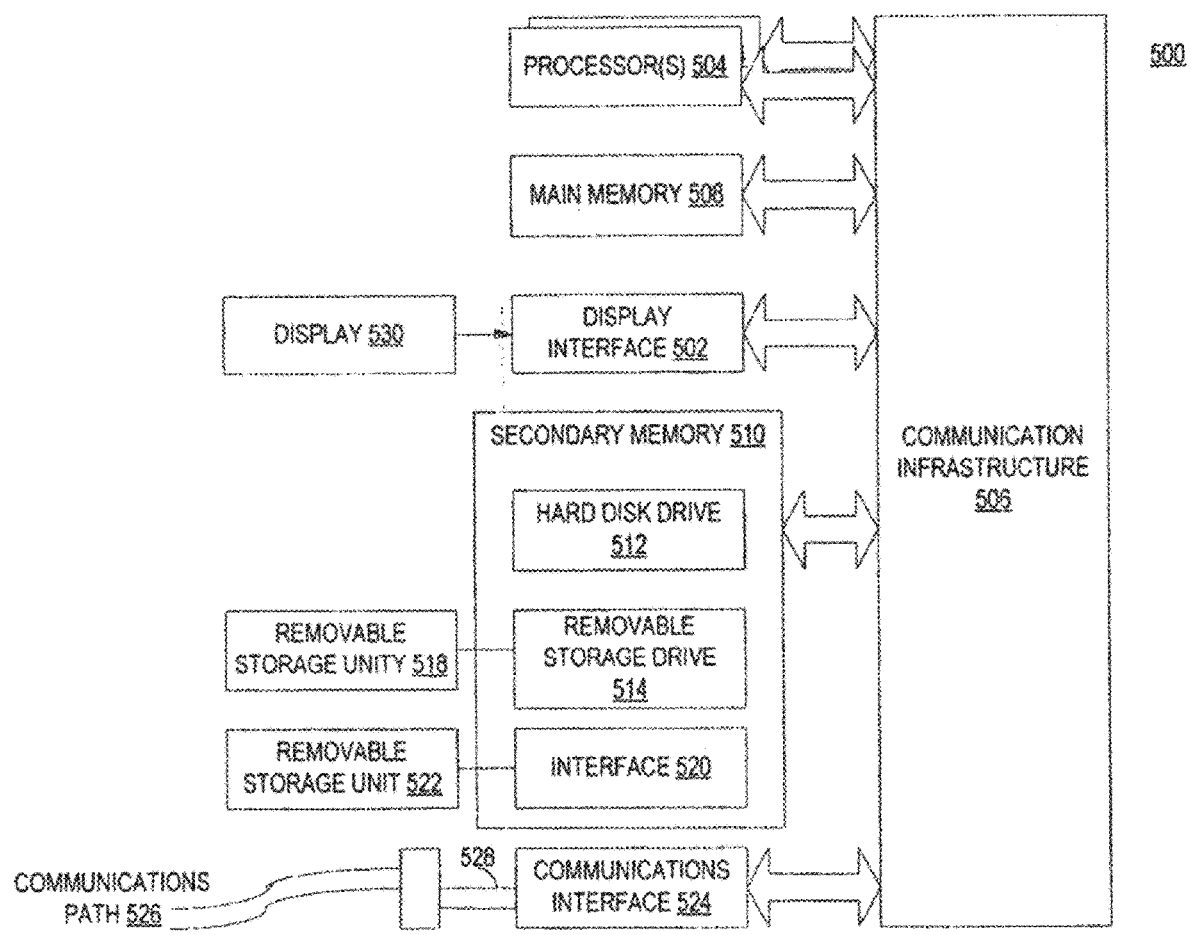
FIG. 5 depicts an exemplary diagram illustrating an exemplary computer/communications device hardware architecture as may be used in various components of exemplary embodiments of the present invention, according to an exemplary embodiment.

FIG. 5 depicts an exemplary diagram 500 illustrating an exemplary computer/communications device hardware architecture as may be used in various components of exemplary embodiments of the present invention. FIG. 5 depicts an exemplary diagram 500 illustrating an exemplary computer/communications device hardware architecture as may be used in various components of exemplary embodiments of the present invention. FIG. 5 depicts an exemplary view 500 of an exemplary computer system 102, 104, 112 as may be used in implementing an exemplary embodiment of the present invention. FIG. 5 depicts an exemplary embodiment of a computer system that may be used in computing devices such as, e.g., but not limited to, user devices 102, 102*a*, 102*b*, promotions service provide device 108, 108*a*, 108*b*, and/or web server 108*a* and/or application server 108*b*, social network computing device(s) 112 of social network 110, vendor user devices 116, 116*a*, 116*b* and 114, network components 104, etc. according to an exemplary embodiment of the present invention. FIG. 5 depicts an exemplary embodiment of a computer system that may be used as client device 108, or a server device (not shown), etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8 . . . , etc. available from MICROSOFT® Corporation of Redmond, Wash., U.S.A., SOLARIS® from SUN® Microsystems of Santa Clara, Calif., U.S.A, OS/2 from IBM® Corporation of Armonk, N.Y, U.S.A, Mac/OS, OS/X, iOS from APPLE® Corporation of Cupertino, Calif., U.S.A, etc, or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPod, an iPhone, a smartphone, an iPad, a tablet based device, a smart phone, an ANDROID OS device, an iOS device, a Symbian based device, a Windows 8 device, etc., may also be implemented using a computer such as that shown in FIG. 5.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, etc. The removable storage drive 514 may, e.g., but not limited to, read from and/or write to a removable storage unit 518 in a well known manner. Removable storage unit 518, also called a program storage device or a compute program product, may represent, e.g., but not limited to, a floppy disk, magnetic tape, optical disk, compact disk, etc. which may be read from and written to by removable storage drive 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device such as, e.g., (but not limited to) a mouse or other pointing device such as a digitizer, and a keyboard or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot, PC Card, SDRAM, universal serial bus (USB), solid state device (SSD), and card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to, a channel). This channel 526 may carry signals 528, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," ""example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

In another exemplary embodiment, the invention may be directed to a computer program product comprising a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily m firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11 compliant wireless local area network (LAN), 802.16-compliant wide area network (WAN), and ultrawideband (UWB), etc.

Bluetooth is an emerging wireless technology prom1smg to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.1 lg-2003, etc.), etc.

FIG. 6A depicts another exemplary embodiment of a diagram 600 illustrating an exemplary user interface screenshot depicting an exemplary interface for creating a fixed offer, variable price dynamic value coupon thread generator according to an exemplary embodiment. The reader is directed to the detailed discussion above with reference to FIGS. 1E, and 3A for further information regarding alternative exemplary embodiments of the present invention.

FIG. 6B depicts another exemplary embodiment of a diagram 620 illustrating an exemplary user interface screenshot depicting an exemplary interface for creating a fixed price, variable dynamic value coupon thread generator, according to an exemplary embodiment. The reader is directed to the detailed discussion above with reference to FIGS. 3B, and 1E for further information regarding an alternative exemplary embodiment of the present invention.

Figure 6C:
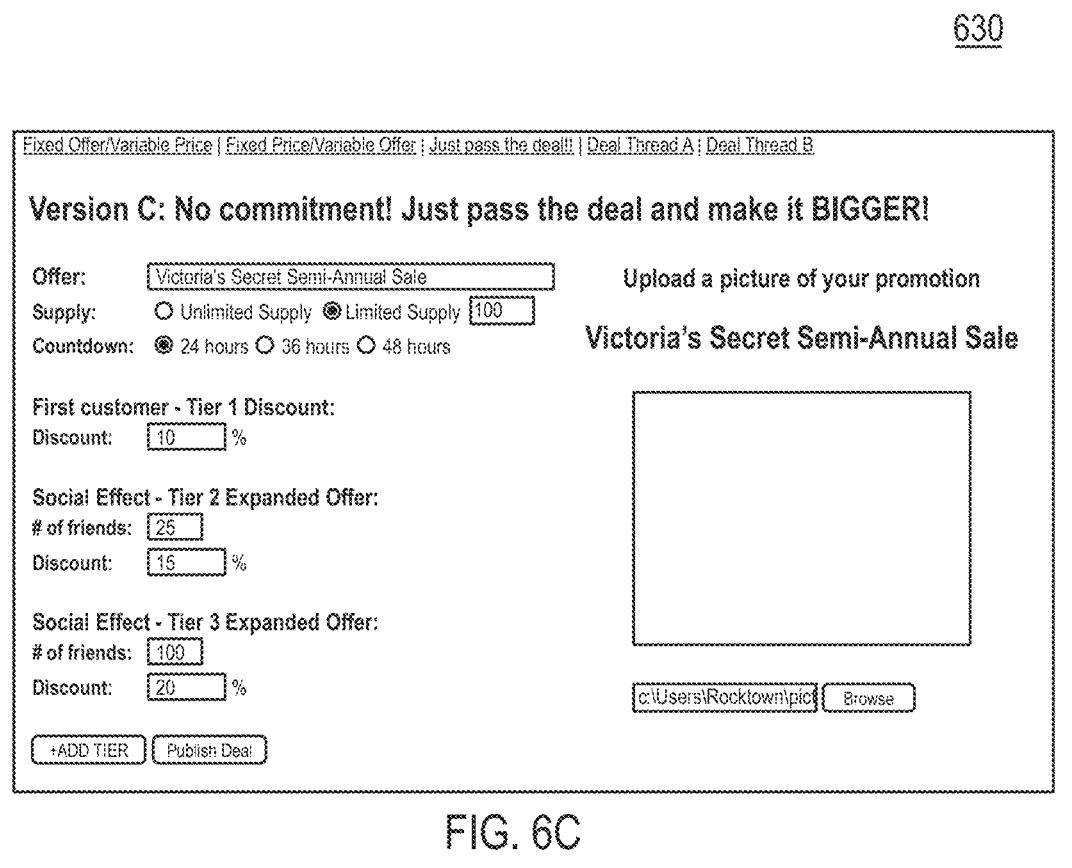

FIG. 6C depicts another exemplary embodiment of a diagram 630 illustrating an exemplary user interface screenshot depicting an exemplary interface for creating an exemplary interface for creating a no commitment, just pass the deal and make it bigger exemplary promotion dynamic value coupon thread generator, according to an exemplary embodiment. The reader is directed to the detailed discussion above with reference to FIGS. 3C, and 1E for further information regarding an exemplary embodiment of the present invention.

FIG. 7A depicts a diagram 700 of another exemplary embodiment of an exemplary environment illustrating an exemplary user interface mockup of an exemplary dynamic value coupon/promotion thread portal application executing on a user client device, depicting an exemplary fixed offer, variable price offering, according to an exemplary embodiment. The reader is directed to the detailed discussion of exemplary user portals for users considering joining a thread, above with reference to FIG. 2A, and FIGS. 4A,4B, and 4C above for further exemplary detailed information regarding processes of creating a thread generator, and generating a thread using an exemplary thread generator, according to an exemplary embodiment of the present invention.

Figure 7B:
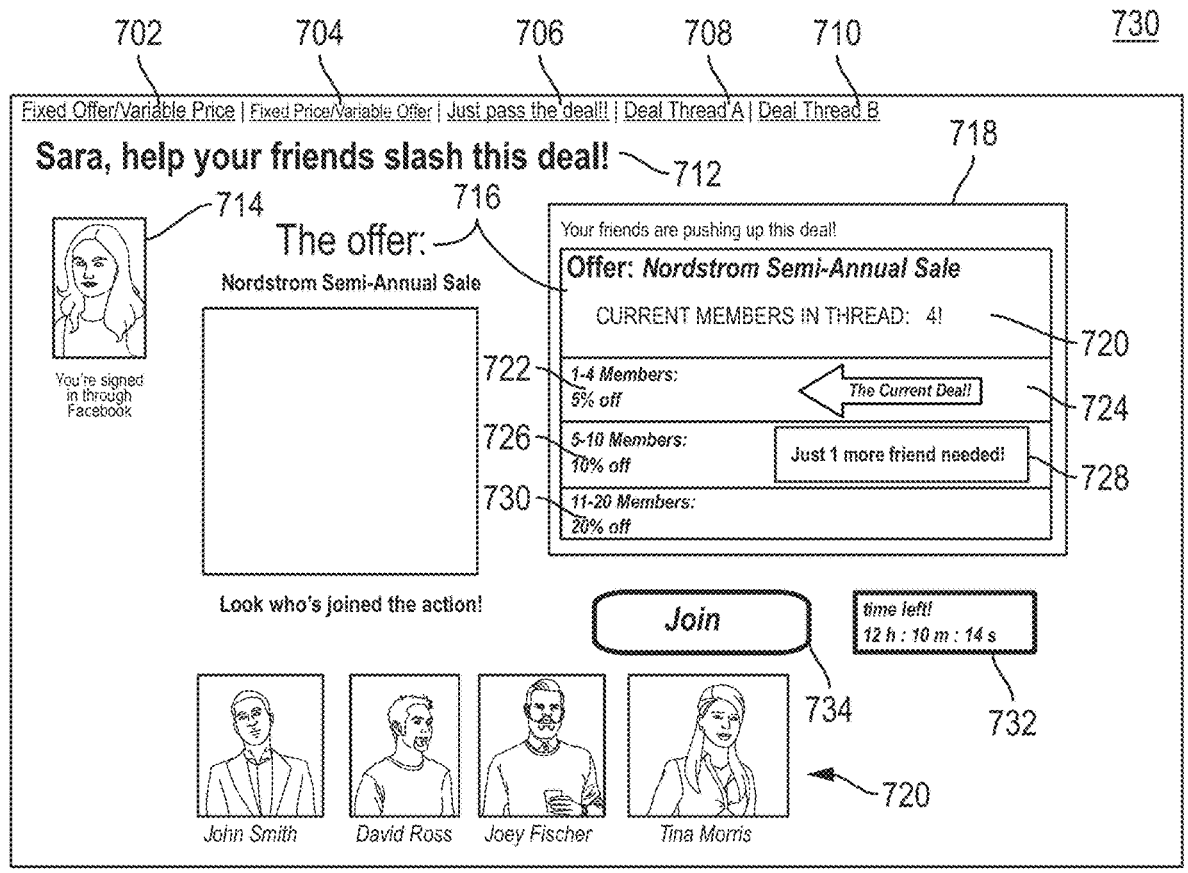
FIG. 7B depicts an exemplary embodiment of a diagram illustrating an exemplary user interface screenshot depicting an user interface mockup of an exemplary dynamic value coupon/promotion thread portal exemplary fixed price, variable offering thread portal, according to an exemplary embodiment.

FIG. 7B depicts another exemplary embodiment of a diagram 720 illustrating an exemplary user interface screenshot depicting an exemplary user interface mockup of an exemplary dynamic value coupon/promotion thread portal fixed price, variable offering thread portal, according to an exemplary embodiment. The reader is directed to the detailed discussion of exemplary user portals for users considering joining a thread, above with reference to FIG. 2A, and FIGS. 4A, 4B and 4C for further information regarding an exemplary embodiment of the present invention.

FIG. 8A1 depicts an exemplary embodiment of a diagram 800 illustrating an exemplary interface definition for an exemplary shutdown sequence as will be apparent to those having ordinary skill in the relevant art, according to an exemplary embodiment.

FIG. 8A2 depicts another exemplary embodiment of a diagram, similar to FIG. 8A1, illustrating an exemplary interface definition for an exemplary thread generator as will be apparent to those having ordinary skill in the relevant art, according to an exemplary embodiment.

FIG. 8B1 depicts an exemplary embodiment of a diagram 820 illustrating an exemplary interface definition for an exemplary multi-tier offering thread of exemplary n-tiers, as will be apparent to those skilled in the relevant art, according to an exemplary embodiment.

FIG. 8B2 depicts another exemplary embodiment of a diagram, similar to FIG. 8B1, illustrating an exemplary interface definition for an exemplary multi-tier offering thread of n-tiers, as will be apparent to those skilled in the relevant art, according to an exemplary embodiment.

In one exemplary embodiment, customers may use a hyperlink with embedded identifiers to raise XN [Buyer Quantity] to achieve a Br [Break].

In one exemplary embodiment, any Cr# (Creation) generated by pioneers are presented via a dashboard display the pioneer uses to manage their one or more Cr#.

In one exemplary embodiment, a Cr# can never be edited, only cancelled and may be used as a template to generate a new Cr.

In one exemplary embodiment, a Cr# (Creation, deal) can be made such that the pioneer can cancel more instances of the Cr# from being created, but once an instance is created the instance (thread) remains independent of the Cr# source (thread generator) of the instance (thread). This can enable, for example, a pioneer to cancel a promotion but not violate contractual terms as set forth by the Tr [Terms] of active C [Shutdown sequences] wherein one or more X [example buyers] have already joined the promotion. This could be important because examples (buyers) may be serving as examples of committed customers to encourage other potential customers to join the C [shutdown sequence] instance.

In one exemplary embodiment, through various modalities X's [Example Buyers] may come to learn of a Cr, provide R [Remuneration Needed] which can be in form of held funds on creditcard, and then are incentived (given an incentive) to encourage the joining of more X [Example Buyers] to the shutdown sequence before it shuts down to attain Br [Breaks], central to the theme of the invention.

In one exemplary embodiment, of central importance is utilization of EN [entity networks] to have X [Example Buyers] pass instances of shutdown sequences to entities within that example buyer's EN [entity network]. In one exemplary embodiment, incentive structures may be used based on conversion, such as credits [in the form of monetary compensation, redeemable vouchers for products/services, etc.] to one, many, or perhaps all below on a referral hierarchy. This can be variably set by the pioneer during Cr specification.

Figure 8C:
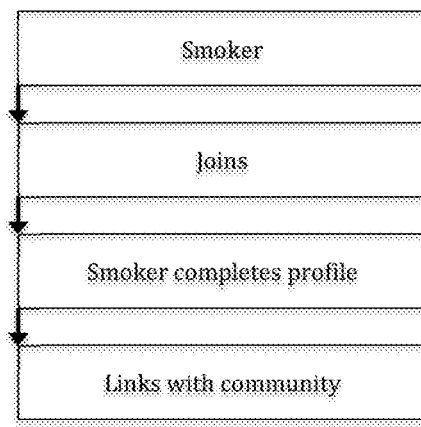
FIG. 8C depicts an exemplary embodiment of a diagram illustrating an exemplary illustrating a more detailed definition for acronyms used in FIGS. 8A1, 8A2, 8B1 and 8B2, as well as a simple flow diagram illustrating an exemplary embodiment of a person with health issues, or habits, where the patient joins a social network group, completes a user profile, and may link with others in a similar position of health (smoker, cancer sufferer, etc.), according to an exemplary embodiment.

FIG. 8C depicts an exemplary embodiment of a diagram 830 illustrating a more detailed definition for acronyms used in FIGS. 8A1, 8A2, 8B1 and 8B2, as well as a simple flow diagram illustrating an exemplary embodiment of a person with health issues, or habits, where the patient joins a social network group, completes a user profile, and may link with others in a similar position of health (smoker, cancer sufferer, etc.), according to an exemplary embodiment.

Exemplary and Nonlimiting Term Glossary

Pioneer Generates Cr (creations thread generators) that can produce instances of shutdown sequences (threads) as specified by Cl (classes) of promotion types CI Class (Promotion type (Fixed Price, Variable Offer; Fixed Offer, Variable Price; etc.))

X Example Buyer (Buyer who has joined an instance of a Cr and now serves as an exemplary buyer on the thread)

O Offer

R Remuneration Needed (Price, Requirements)

S Variable

V Fixed

N Name

Tr Terms

A Art

C Sequence shutdown specification (Thread expiry specifications (ex. Countdown timer, etc.)

B Base (as in BO [Base Offer], BR [Base Remuneration Required])

Br Break (Tier, Milestone)

FIG. 9 depicts an exemplary embodiment of a diagram 900 illustrating an exemplary process of creating a promotion as illustrated in another exemplary embodiment of a prompting list of user instructions to be displayed by the computing device, according to an exemplary embodiment. The reader is directed to the detailed discussion above with reference to FIGS. 3A-3C, and FIGS. 4A and 4B above for further exemplary detailed information regarding an exemplary embodiment of the present invention.

FIG. 10 depicts an exemplary embodiment of a diagram 1000 illustrating an exemplary interface definition for an exemplary multi-tier offering thread of n-tiers, as will be apparent to those skilled in the relevant art, according to an exemplary embodiment.

Connectivity to Internet Service Providers (ISPs)

The public switched telephone network (PSTN) (not shown other than clouds in FIG. 1A-1D, and in FIG. 11), can provide calling party 1102a a data connection to an ISP (i.e. similar to client 1118b).

Network 1200 can also include an Internet service provider (ISP) (not shown) which could include a server computer 1122 coupled to a data network 1142 as will be discussed further below with reference to FIG. 11. The Internet is a well-known, worldwide network comprising several large networks connected together by data links. These links can include, for example, Integrated Digital Services Network (ISDN), T1, T3, FDDI and SONET links. Alternatively, an internet can be a private network interconnecting a plurality of LANs and/or WANs, such as, for example, an intranet. An ISP can provide Internet access services for subscribers such as client 1118*b*.

To establish a connection with an ISP, client 1118*b* can use a host computer connected to a modem (modulator/demodulator) 1130*b*. The modem can modulate data from the host computer into a form (traditionally an analog form) for transmission to the LEC facilities. Typically, the LEC facilities convert the incoming analog signal into a digital form. In one embodiment, the data is converted into the point-to-point protocol (PPP) format. (PPP is a well-known protocol that permits a computer to establish a connection with the Internet using a standard modem. It supports high-quality, graphical user-interfaces.) As those skilled in the art will recognize, other formats are available, including, e.g., a transmission control program, internet protocol (TCP/IP) packet format, a user datagram protocol, internet protocol (UDP/IP) packet format, an asynchronous transfer mode (ATM) cell packet format, a serial line interface protocol (SLIP) protocol format, a point-to-point (PPP) protocol format, a point-to-point tunneling protocol (PPTP) format, a NETBIOS extended user interface (NETBEUI) protocol format, an Appletalk protocol format, a DECnet, BANYAN/VINES, an internet packet exchange (IPX) protocol format, and an internet control message protocol (ICMP) protocol format.

Although perhaps not shown, the exemplary embodiments of the present invention are equally applicable to any of, e.g., but not limited to, circuit switched, packet switched, wired line, wireless, cable TV (CATV), voice over power line, etc. networks, whether voice based, cell based, analog, digital, personal area, local area, and/or wide area networks, music, video, audio, movie, broadcast, digital and analog contents.

Exemplary Communications Links

Figure 11:
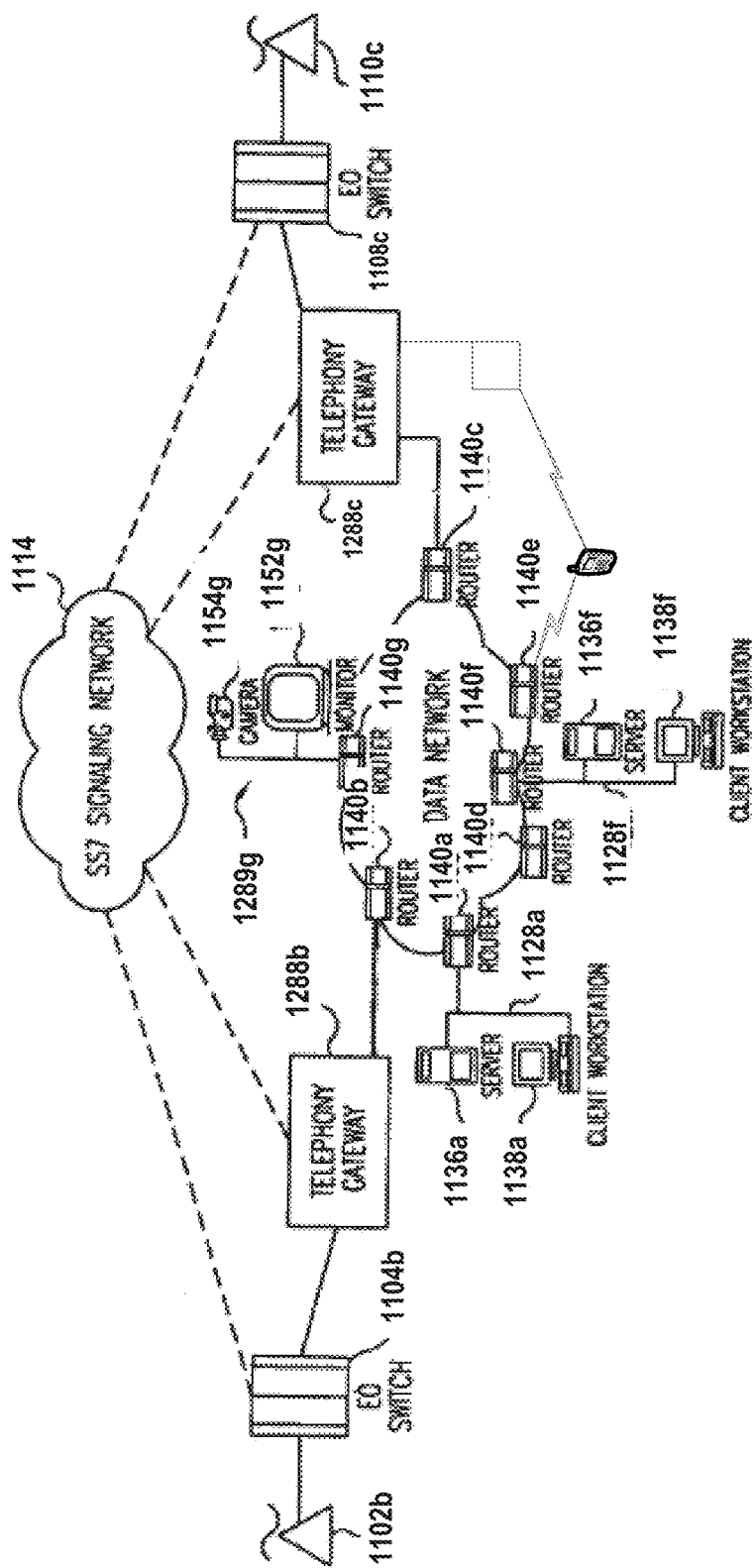
FIG. 11 depicts a diagram 1300 illustrating an exemplary voice over a data network hardware architecture as may illustrate an exemplary embodiment of a voice over Internet Protocol (VoIP) hybrid communications network including both VoIP devices, as well as PSTN devices, coupled together via an exemplary voice over IP network as may include, e.g., but not limited to, gateways, routers, signaling devices, SIP and/or MGCP protocol devices, soft switches, etc., as will be apparent to those skilled in the relevant art, as may be used as an exemplary embodiment of a network architecture platform over which a service provider according to an exemplary embodiment may distribute its services offerings.

Note that FIG. 11 and other figures described herein include lines which may refer to communications lines or which may refer to logical connections between network nodes, or systems, which are physically implemented by telecommunications carrier devices. These carrier devices include circuits and network nodes between the circuits including, for example, digital access and cross-connect system (DACS), regenerators, tandems, copper wires, and fiber optic cable. It may be apparent to persons having ordinary skill in the art that alternative communications lines can be used to connect one or more telecommunications systems devices. Also, a telecommunications carrier as defined here, can include, for example, a LEC, a CLEC, an IXC, an Enhanced Service Provider (ESP), a global or international services provider such as a global point-of-presence (GPOP), and an intelligent peripheral.

EO 1104*a* and AT 1206 are connected by a trunk. A trunk connects an AT to an EO. A trunk can be called an inter machine trunk (IMT). AT 1208 and EO 1108*a* are connected by a trunk which can be an IMT.

Referring to FIG. 11, EO 1104 and PBX 1112 can be connected by a private line with a dial tone. A private line can also connect an ISP (not shown) to EO 104, for example. A private line with a dial tone can be connected to a modem bay or access converter equipment at the ISP. Examples of a private line are a channelized T1 or integrated services digital network (ISDN) primary rate interface (PRI). An ISP can also attach to the Internet by means of a pipe or dedicated communications facility. A pipe can be a dedicated communications facility. A private line can handle data modem traffic to and from an ISP.

Trunks can handle switched voice traffic and data traffic. For example, trunks can include digital signals DS1-DS4 transmitted over T1-T4 carriers. Table 1 provides typical carriers, along with their respective digital signals, number of channels, and bandwidth capacities.

TABLE 1

| Digital signal | Number of channels | Designation of carrier | Bandwidth in Megabits per second (Mbps) |
|---|---|---|---|
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks can include optical carriers (OCs), such as OC-1, OC-3, etc. Table 2 provides typical optical carriers, along with their respective synchronous transport signals (STSs), ITU designations, and bandwidth capacities.

TABLE 2

| Optical carrier (OC) signal | Electrical signal, or synchronous transport signal (STS) | International Telecommunications Union (ITU) terminology | Bandwidth in Megabits per second (Mbps) |
|---|---|---|---|
| OC-1 | STS-1 | | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

As noted, a private line is a connection that can carry data modem traffic. A private line can be a direct channel specifically dedicated to a customer's use between two specified points. A private line can also be known as a leased line. In one embodiment, a private line is an ISDN/primary rate interface (ISDN PRI) connection. An ISDN PRI connection can include a single signal channel (called a data or D channel) on a T1, with the remaining 23 channels being used as bearer or B channels. (Bearer channels are digital channels that bear voice and data information.) If multiple ISDN PRI lines are used, the signaling for all of the lines can be carried over a single D channel, freeing up the remaining lines to carry only bearer channels.

Exemplary Converged Telecommunications Traffic

Telecommunications traffic can be sent and received from any network node of a telecommunications carrier. A telecommunications carrier can include, for example, a LEC, a CLEC, an IXC, and an Enhanced Service Provider (ESP). In an embodiment, this traffic can be received from a network node which is, for example, a class 5 switch, such as EO 1104*a*, or from a class 3/4 switch, such as AT 1206. Alternatively, the network system can also be, for example, a CLEC, or other enhanced service provider (ESP), an international gateway or global point-of-presence (GPOP), or an intelligent peripheral.

Voice traffic refers, for example, to a switched voice connection between calling party 1102*a* and called party 1110*a*. It is important to note that this is on a point-to-point dedicated path, i.e., that bandwidth is allocated whether it is being used or not. A switched voice connection is established between calling party 1102*a* and EO 1104*a,* then to AT 1206 then over an IXC's network such as that of IXC 1106*a* to AT 1208 and then to EO 1108*a* and over a trunk to called party 1110*a.* In another embodiment, AT 1206 or IXC 1106*a* can also be, for example, a CLEC, or other enhanced service provider (ESP), an international gateway or global point-of-presence (GPOP), or an intelligent peripheral.

It is possible that calling party 1102*a* is a computer with a data connection to a server over the voice network. Data traffic refers, for example, to a data connection between a calling party 1102*a* (using a modem) and a server 1122*b* that could be part of an ISP. A data connection can be established, e.g., between calling party 1102*a* and EO 1104*a,* then to AT 1206, then to CLEC 1214, then over a fixed wireless CLEC 1209 link to PBX 1112*b* to a modem 1130*b* associated with server 1122*b.*

FIG. 11 depicts a diagram 1300 illustrating an exemplary voice over a data network hardware converged in an exemplary voice over data heterogeneous network architecture which may be coupled to the conventional voice based local exchange earner (LEC) and inter exchange carrier (IXC) based public switched telephone network, as may illustrate an exemplary networking environment over which various exemplary transmissions, sending, and receiving may be enabled over an exemplary embodiment of a voice over Internet Protocol (VoIP) hybrid communications network including both VoIP devices, as well as PSTN devices, coupled together via an exemplary voice over IP network as may include, e.g., but not limited to, gateways, routers, signaling devices, SIP and/or MGCP protocol devices, soft switches, etc., as will be apparent to those skilled in the relevant art, as may be used as an exemplary embodiment of a network architecture platform over which a service provider according to an exemplary embodiment may distribute its services offerings.

A voice-over-Internet Protocol (VoIP) call may also be made and telephony and other data may be delivered over a data network as shown in FIG. 11.

FIG. 11 depicts a diagram 1300 illustrating an exemplary voice over a data network hardware architecture as may illustrate an exemplary voice over Internet Protocol (VoIP) hybrid communications network including both VoIP devices, as well as PSTN devices, coupled together via an exemplary voice over IP network as may include, e.g., but not limited to, gateways, routers, signaling devices, SIP and/or MGCP protocol devices, softswitches, etc., as will be apparent to those skilled in the relevant art.

In one exemplary embodiment, a particular class of thread generator (shutdown sequence) may be set by a promoter to enable a variation of a "fixed price, variable offer" and/or "fixed offer, variable price" thread class wherein the offer (or offers if there are multiple offer tiers) are a percentage off discount with other possible terms associated such as, e.g., but not limited to, a maximum dollars (i.e., value) the coupon voucher may used for, expiration date, etc. According to an exemplary embodiment, the exemplary thread generator can enable, for example, but not limited to, "pre-selling of coupons" to users.

Exemplary embodiments may include the following embodiments:

1. A computer implemented method of generating a multi-tier dynamic value promotion thread generator comprising:
creating, by at least one computer processor, the thread generator comprising: receiving, by the at least one computer processor, terms of the at least one multi-tier dynamic value promotion thread generator adapted to generate at least one thread, wherein said terms comprise:
at least one tier-specific benefit term, and at least one tier-specific requirement term for each of at least two tier levels of the thread generator; and
at least one thread-specific countdown timer, wherein upon generation of a generated thread by a first customer user, a value of said tier-specific benefit term of said generated thread may be determined by comparing: a number of joined customer users upon expiration of said countdown timer, to said tier-specific requirement terms, to identify the tier of said at least two tier levels corresponding to said number of joined customer users.

2. The method according to claim 1, further comprising:
transmitting, by the at least one computer processor, a link to the dynamic value multi-tier promotion thread to the first user upon creating the generated thread by the thread generator, for sharing by the first user to at least one other customer user.

3. The method according to claim 1, wherein upon receiving notification of the first customer joining the promotion offering thread,
initiating, by the at least one computer processor, the limited time countdown timer until expiration; and
counting, by the at least one computer processor, a number of joined customer users joining the generated multi-tier dynamic value promotion thread.

4. The method according to claim 1, wherein said plurality of said tiers comprise mutually exclusive requirement terms.

5. The method according to claim 1, wherein any customer users joining the thread comprises:
receiving, by the at least one computer processor, an identifier for the any customer users; and
associating, by the at least one computer processor, the identifier for the any customer users with the generated thread.

6. The method according to claim 5, wherein said identifier for the any customer users comprises at least one of:
a financial agreement to purchase the multi-tier dynamic value promotion multi-tier thread;
a customer number of the any customer user;
a credit card number of the any customer user;
a debit card number of the any customer user;
a social security number of the any customer user;
an email address of the any customer user; or
a user name of the any customer user.

7. The method according to claim 1, wherein upon said expiration of said countdown timer, the thread benefit is set based on the tier of the at least two tiers corresponding to the amount of joined customer users.

8. The method according to claim 1, wherein said at least two tiers comprises at least three tiers.

9. A system of providing a dynamic value promotion thread generator comprising:
a computer memory;
at least one computer processor coupled to said memory, wherein said at least one computer processor is adapted:
to create the thread generator comprising wherein said at least one computer processor is adapted to:
receive terms of the at least one multi-tier dynamic value promotion thread generator adapted to generate at least one thread, wherein said terms comprise:
at least one tier-specific benefit term, and at least one tier-specific requirement term for each of at least two tier levels of the thread generator; and
at least one thread-specific countdown timer,
wherein upon generation of a generated thread by a first customer user, a value of said tier-specific benefit term of said generated thread may be determined by comparing: a number of joined customer users upon expiration of said countdown timer, to said tier-specific requirement terms, to identify the tier of said at least two tier levels corresponding to said number of joined customer users.

10. A computer program product embodied on a computer readable medium, said
computer program product comprising program logic adapted to be executed on a computer processor to implement a method of providing a multi-tier dynamic value promotion thread generator comprising:
creating, by at least one computer processor, the thread generator comprising:
receiving, by the at least one computer processor, terms of the at least one multi-tier dynamic value promotion thread generator adapted to generate at least one thread,
wherein said terms comprise:
at least one tier-specific benefit term, and at least one tier-specific requirement term for each of at least two tier levels of the thread generator; and
at least one thread-specific countdown timer,
wherein upon generation of a generated thread by a first customer user, a value of said tier-specific benefit term of said generated thread may be determined by comparing: a number of joined customer users upon expiration of said countdown timer, to said tier-specific requirement terms, to identify the tier of said at least two tier levels corresponding to said number of joined customer users.

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

The invention claimed is:

1. A method comprising:
generating, using one or more computer processors, a multi-tiered thread based on a fixed price and a specification for a first tier offering and a second tier offering for the fixed price, the specification for the first tier offering including a first offering and a first minimum number of users required to join the multi-tiered thread to redeem the first offering for the fixed price, and the specification for the second tier offering including a second offering different from the first offering and a second minimum number of users required to join the multi-tiered thread to redeem the second offering for the fixed price, the multi-tiered thread being associated with a communication link;
in response to a current number of users that have joined the multi-tiered thread via the communication link being equal to or greater than the first minimum number of users and less than the second minimum number of users, determining, using the one or more computer processors, a current offering for the fixed price to be the first offering; and
in response to the current number of users that have joined the multi-tiered thread via the communication link being equal to or greater than the second minimum number of users, determining, using the one or more computer processors, the current offering for the fixed price to be the second offering.

2. The method of claim 1, wherein the multi-tiered thread indicates a countdown for expiration of the multi-tiered thread.

3. The method of claim 2, wherein one of the first offering or the second offering is redeemable by the current number of users of the multi-tiered thread for the fixed price at the expiration of the multi-tiered thread.

4. The method of claim 1 wherein the multi-tiered thread indicates a maximum number of users allowed to join the multi-tiered thread before expiration of the multi-tiered thread.

5. The method of claim 1, wherein the first minimum number of users is at least one.

6. The method of claim 1, wherein the fixed price is zero.

7. The method of claim 1, wherein the multi-tiered thread includes a picture depicting the first tier offering and the second tier offering.

8. The method of claim 1, wherein the multi-tiered thread includes a prompt that indicates the current offering for the fixed price to be (i) the first offering in response to the current number of users that have joined the multi-tiered thread being equal to or greater than the first minimum number of users and less than the second minimum number of users, and (ii) the second offering in response to the current number of users that have joined the multi-tiered thread being equal to or greater than the second minimum number of users.

9. The method of claim 1, wherein the multi-tiered thread includes a prompt that indicates a number of users that need to join the multi-tiered thread to redeem an offering other than the current offering.

10. The method of claim 1, further comprising:
generating, using the one or more computer processors, the multi-tiered thread based on a specification for a third tier offering for the fixed price, the specification for the third tier offering including a third offering and a third minimum number of users required to join the multi-tiered thread to redeem the third offering for the fixed price;
in response to the current number of users that have joined the multi-tiered thread being equal to or greater than the second minimum number of users and less than the third minimum number of users, determining, using the one or more computer processors, the current offering for the fixed price to be the second offering; and
in response to the current number of users that have joined the multi-tiered thread being equal to or greater than the third minimum number of users, determining, using the one or more computer processors, the current offering for the fixed price to be the third offering.

11. The method of claim 1, further comprising:
wherein the communication link is a hyperlink associated with the multi-tiered thread, the hyperlink including a unique key identifying the multi-tiered thread and a user.

12. The method of claim 1, further comprising:
allowing access, using the one or more computer processors, to the multi-tiered thread in response to a selection of the communication link.

13. A system comprising:
circuitry configured to:
generate a multi-tiered thread based on a fixed price and a specification for a first tier offering and a second tier offering for the fixed price, the specification for the first tier offering including a first offering and a first minimum number of users required to join the multi-tiered thread to redeem the first offering for the fixed price, and the specification for the second tier offering including a second offering different from the first offering and a second minimum number of users required to join the multi-tiered thread to redeem the second offering for the fixed price, the multi-tiered thread being associated with a communication link;

in response to a current number of users that have joined the multi-tiered thread via the communication link being equal to or greater than the first minimum number of users and less than the second minimum number of users, determine a current offering for the fixed price to be the first offering; and in response to the current number of users that have joined the multi-tiered thread via the communication link being equal to or greater than the second minimum number of users, determine the current offering for the fixed price to be the second offering.

14. A non-transitory computer-readable medium including computer readable instructions that, when executed by a computer, cause the computer to execute a method comprising:

generating a multi-tiered thread based on a fixed price and a specification for a first tier offering and a second tier offering for the fixed price, the specification for the first tier offering including a first offering and a first minimum number of users required to join the multi-tiered thread to redeem the first offering for the fixed price, and the specification for the second tier offering including a second offering different from the first offering and a second minimum number of users required to join the multi-tiered thread to redeem the second offering for the fixed price, the multi-tiered thread being associated with a communication link;

in response to a current number of users that have joined the multi-tiered thread via the communication link being equal to or greater than the first minimum number of users and less than the second minimum number of users, determining a current offering for the fixed price to be the first offering; and in response to the current number of users that have joined the multi-tiered thread via the communication link being equal to or greater than the second minimum number of users, determining the current offering for the fixed price to be the second offering.

* * * * *